United States Patent [19]

Huttenlocher et al.

[11] Patent Number: 5,884,014
[45] Date of Patent: Mar. 16, 1999

US005884014A

[54] FONTLESS STRUCTURED DOCUMENT IMAGE REPRESENTATIONS FOR EFFICIENT RENDERING

[75] Inventors: Daniel P. Huttenlocher, Ithaca, N.Y.; William J. Rucklidge, Mountain View, Calif.

[73] Assignee: Xerox Corporation, Stamford, Conn.

[21] Appl. No.: 652,864

[22] Filed: May 23, 1996

[51] Int. Cl.$^6$ .................................................. G06K 15/02
[52] U.S. Cl. ................................ 395/114; 395/102
[58] Field of Search .................................. 395/101, 117, 395/102, 112, 114, 113, 115, 116; 382/243, 232, 239; 345/202, 203, 433; 358/467, 426, 433, 432, 462

[56] References Cited

U.S. PATENT DOCUMENTS

| | | | |
|---|---|---|---|
| 4,410,916 | 10/1983 | Pratt et al. | 358/263 |
| 4,499,499 | 2/1985 | Brickman et al. | 358/263 |
| 4,566,128 | 1/1986 | Araki | 382/56 |
| 4,703,516 | 10/1987 | Fukuda | 382/56 |
| 4,769,716 | 9/1988 | Casey et al. | 358/263 |
| 5,058,187 | 10/1991 | Kim | 382/56 |
| 5,303,313 | 4/1994 | Mark et al. | 382/56 |
| 5,305,433 | 4/1994 | Ohno | 395/150 |
| 5,504,843 | 4/1996 | Catapano et al. | 395/115 |

OTHER PUBLICATIONS

Ian H. Witten, Alistair Moffat and Timothy C. Bell, "Textual Images", *Managing Gigabytes: Compressing and Indexing Documents and Images,* Chapter 7, New York:Van Nostrand Reinhold, 1994, pp. 254–293.

Holt, M. J. J. and C. S. Xydeas, "Recent Developments in Image Data Compression for Digital Facsimile", *ICL Technical Journal,* May 1986, pp. 123–146.

K. Mohiuddin, J. Rissanen and R. Arps, "Lossless Binary Image Compression Based on Pattern Matching", *International Conference on Computers, Systems and Signal Processing,* Bangalore, India, Dec. 9–12, 1984, pp. 447–451.

Gary E. Kopec and Mauricio Lomelin, "Document–Specific Character Template Estimation", *International Symposium on Electronic Imaging: Science & Technology* (IS&T/SPIE), Jan. 27–Feb. 2, 1996.

Witten, I. H., T. C. Bell, M. E. Harrison, M. L. James and A. Moffat, "Textual Image Compression", *Proceedings IEEE Data Compression Conference,* 1992, pp. 42–51.

Ascher, R. N. and G. Nagy, "A Means for Achieving a High Degree of Compaction on Scan–Digitized Printed Text", *IEEE Transactions on Computers,* 1974, C–23(11), pp. 1174–1179.

(List continued on next page.)

*Primary Examiner*—Arthur G. Evans

[57] ABSTRACT

A processor is provided with a first set of digital information that includes a first, resolution-independent structured representation of a document. This first representation is one from which various image collections (e.g., sets of page images) can be obtained, each such image in each such collection having a characteristic resolution. From the first set of digital information, the processor produces a second set of digital information that includes a second, resolution-dependent structured representation of the document. The second structured representation is a lossless representation of a particular one of the image collections obtainable from the first structured representation, and it includes a set of tokens and a set of positions. The second set of digital information is produced by extracting the tokens from the first structured representation, and by determining the positions from the first structured representation. Each extracted token includes pixel data representing a subimage of the particular image collection. Each position is a position of a token subimage in the particular image collection. At least one of the token subimages contains multiple pixels and occurs at more than one position in the image collection. The second set of digital information thus produced can be made available for further use (e.g., distribution, transmission, storage, subsequent reconversion into page images). Applications of the invention include high-speed printing and Internet (World Wide Web) document display.

29 Claims, 16 Drawing Sheets

OTHER PUBLICATIONS

Pratt, W. K., P. J. Capitant, W. H. Chen, E. R. Hamilton, and R. H. Wallis, "Combined Symbol Matching Facsimile Data Compression System", *Proceedings IEEE,* 1980, 68(7), pp. 786–796.

Johnsen, O., J. Segen and G. L. Cash, "Coding of Two–Level Pictures by Pattern Matching and Substitution", *Bell Systems Technical Journal,* 1983, 62(8), pp. 2513–2545.

Mohiuddin, K. M., *Pattern Matching with Application to Binary Image Compression,* Ph. D. thesis, Stanford University, Stanford, California, 1982.

Adobe Systems, Inc., *Postcript Language Reference Manual,* (2nd ed.), (Reading, Mass.:Addision–Wesley, 1990) pp. 266–267, 398, 435, 456, 483, 520 and 591–606,.

Tao Hong and Jonathan J. Hull, "Improving OCR Performance with Word Image Equivalence", *Fourth Annual Symposium on Document Analysis and Information Retrieval,* Apr. 1995, pp. 177–189.

Emberson, H. Textual Image Compression, Honours Project Report, Department of Computer Science, University of Canterbury, New Zealand, 1992.

Wong, K. Y., R. G. Casey and F. M. Wahl, "Document Analysis System", *IBM Journal of Research and Development,* 1982, 26(6), pp. 647–656.

K. Mohiuddin, J. Rissanen and R. Arps, "Lossless Binary Image Compression Based on Pattern Matching", *International Conference on Computers, Systems, and Signal Processing,* Bangalore, India, Dec. 9–12, 1984, pp. 447–451.

Holt, M.J.J. and Xydeas, C.S., "Compression of Document Image Data by Symbol Matching," in Capellini, V. and Marconi, R., eds., *Advances in Image Processing and Pattern Recognition,* Elsevier Science Publishers, 1986, pp. 184–190.

A. Broder and M. Mitzenmacher, "Pattern–Based Compression of Text Images," *Proceedings DCC'96 Data Compression Conference* (IEEE), Snowbird, Utah, Mar. 31–Apr. 3, 1996, pp. 300–309.

M. Atallah, Y. Genin, and W. Szpankowski, "Pattern Matching Image Compression," *Proceedings DCC'96 Data Compression Conference* (IEEE), Snowbird, Utah, Mar. 31–Apr. 3, 1996, p. 421.

FONTLESS STRUCTURED DOCUMENT IMAGE REPRESENTATIONS FOR EFFICIENT RENDERING

BACKGROUND OF THE INVENTION

The present invention relates to structured document representations and, more particularly, relates to structured document representations suitable for rendering into printable or displayable document raster images, such as bit-mapped binary images or other binary pixel or raster images. The invention further relates to data compression techniques suitable for document image rendering and transmission.

Structured Document Representations

Structured document representations provide digital representations for documents that are organized at a higher, more abstract level than merely an array of pixels. As a simple example, if this page of text is represented in the memory of a computer or in a persistent storage medium such as a hard disk, CD-ROM, or the like as a bitmap, that is, as an array of 1s and 0s indicating black and white pixels, such a representation is considered to be an unstructured representation of the page. In contrast, if the page of text is represented by an ordered set of numeric codes, each code representing one character of text, such a representation is considered to have a modest degree of structure. If the page of text is represented by a set of expressions expressed in a page description language, so as to include information about the appropriate font for the text characters, the positions of the characters on the page, the sizes of the page margins, and so forth, such a representation is a structured representation with a great deal of structure.

Known structured document representation techniques pose a tradeoff between the speed with which a document can be rendered and the expressiveness or subtlety with which it can be represented. This is shown schematically in FIG. 1 (PRIOR ART). As one looks from left to right along the continuum 1 illustrated FIG. 1, the expressiveness of the representations increases, but the rendering speed decreases. Thus, ASCII (American Standard Code for Information Interchange), a purely textual representation without formatting information, renders quickly but lacks formatting information or other information about document structure, and is shown to the left of FIG. 1. Page description languages (PDLs), such as PostScript® (Adobe Systems, Inc., Mountain View, Calif.; Internet: http://www.adobe.com) and Interpress (Xerox Corporation, Stamford, Conn.; Internet: http://www.xerox.com), include a great deal of information about document structure, but require significantly more time to render than purely textual representations, and are shown to the right of continuum 1.

Continuum 1 can be seen as one of document representations having increasing degrees of document structure:

At the left end of continuum 1 are purely textual representations, such as ASCII. These convey only the characters of a textual document, with no information as to font, layout, or other page description information, much less any graphical, pictorial (e.g., photographic) or other information beyond text.

Also near the left end of continuum 1 is HTML (HyperText Markup Language), which is used to represent documents for the Internet's World Wide Web. HTML provides somewhat more flexibility than ASCII, in that it supports embedded graphics, images, audio and video recordings, and hypertext linkng capabilities. However, HTML, too, lacks font and layout (i.e., actual document appearance) information. That is, an HTML document can be rendered (converted to a displayable or printable output) in different yet equally "correct" ways by different Web client ("browser") programs or different computers, or even by the same Web client program running on the same computer at different times. For example, in many Web client programs, the line width of the rendered HTML document varies with the dimensions of the display window that the user has selected. Increase the window size, and line width increases accordingly. The HTML document does not, and cannot, specify the line width. HTML, then, does allow markup of the structure of the document, but not markup of the layout of the document. One can specify, for example, that a block of text is to be a first-level heading, but one cannot specify exactly the font, justification, or other attributes with which that first-level heading will be rendered. (Information on HTML is available on the Internet from the World Wide Web Consortium at http://www.w3.org/pub/WWW/MarkUp/.)

At the right end of continuum 1 are page description languages, such as PostScript and Interpress. These PDLs are full-featured programming languages that permit arbitrarily complex constructs for page layout, graphics, and other document attributes to be expressed in symbolic form.

In the middle of continuum 1 are printer control languages, such as PCL5 (Hewlett-Packard, Palo Alto, Calif.; Internet: http://www.hp.com/), which includes primitives for curve and character drawing.

Also in the middle of continuum 1, but somewhat closer to the PDLs, are cross-platform document exchange formats. These include Portable Document Format (Adobe Systems, Inc.) and Common Ground (Common Ground Software, Belmont, Calif.; Internet: http://www.commonground.com/). Portable Document Format, or PDF, can be used in conjunction with a software program called Adobe Acrobat™. PDF includes a rich set of drawing and rendering operations invocable by any given primitive (available primitives include "draw," "fill," "clip," "text," etc.), but does not include programming language constructs that would, for example, allow the specification of compositions of primitives.

Known structured document representation techniques assume that the rendering engine (e.g., display driver software, printer PDL decomposition software, or other software or hardware for generating a pixel image from the structured document representation) have access to a set of character fonts. Thus a document represented in a PDL can, for example, have text that is to be printed in 12-point Times New Roman font with 18-point Arial Bold headers and footnotes in 10-point Courier. The rendering engine is presumed to have the requisite fonts already stored and available for use. That is, the document itself typically does not supply the font information. Therefore, if the rendering engine is called upon to render a document for which it does not have the necessary font or fonts available, the rendering engine will be unable to produce an authentic rendering of the document. For example, the rendering engine may substitute alternate fonts in lieu of those specified in the structured document representation, or, worse yet, may fail to render anything at all for those passages of the document for which fonts are unavailable.

The fundamental importance of fonts to PDLs is illustrated, for example, by the extensive discussion of fonts in the Adobe Systems, Inc. *PostScript Language Reference*

*Manual* (2d ed. 1990) (hereinafter PostScript Manual). At page 266, the PostScript Manual says that a required entry in all base fonts, encoding, is an "[a]rray of names that maps character codes (integers) to character names-the values in the array." Later, in Appendix E (pages 591–606), the *PostScript Manual* gives several examples of fonts and encoding vectors.

A notion basic to a font is that of labeling, or the semantic significance given to a particular character or symbol. Each character or symbol of a font has an unique associated semantic label. Labeling makes font substitution possible: Characters from different fonts having the same semantic label can be substituted for one another. For example, each of the characters 21, 22, 23, 24, 25, 26 in FIG. 2 (PRIOR ART) has the same semantic significance: Each represents the upper-case form of "E," the fifth letter of the alphabet commonly used in English. However, each appears in a different font. It is apparent from the example of FIG. 2 that font substitution, even if performed for only a single character, can dramatically alter the appearance of the rendered image of a document.

A known printer that accepts as input a PDL document description is shown schematically in FIG. 3 (PRIOR ART). Printer 30 accepts a PDL description 35 that is interpreted, or decomposed, by a rendering unit 31 to produce raster images 32 of pages of the document. Raster images 32 are then given to an image output terminal (IOT) 33, which converts the images 32 to visible marks on paper sheets that are output as printed output 36 for use by a human user. Unfortunately, the speed at which the rendering unit 31 can decompose the input PDL description cannot, in general, match the speed at which the IOT 33 can mark sheets of paper and dispense them as output 36. This is in part because the result of decomposing the PDL description is indeterminate. As noted above, a PDL description such as PDL description 35 does not correspond to a particular image or set of images, but is susceptible of differing interpretations and can be rendered in different ways. Thus rendering unit 31 becomes a bottleneck that limits the overall throughput of printer 30.

Accordingly, a better structured document representation technology is needed. In particular, what is needed is a way to eliminate the tradeoff between expressiveness and rendering speed and, moreover, a way to escape the tyranny of font dependence.

Data Compression for Document Images

Data compression techniques convert large data sets, such as arrays of data for pixel images of documents, into more compact representations from which the original large data sets can be either perfectly or imperfectly recovered. When the recovery is perfect, the compression technique is called lossless; when the recovery is imperfect, the compression technique is called lossy. That is, lossless compression means that no information about the original document image is irretrievably lost in the compression/decompression cycle. With lossy compression, information is irretrievably lost during compression.

Preferably, a data compression technique affords fast, inexpensive decompression and provides faithful rendering together with a high compression ratio, so that compressed data can be stored in a small amount of memory or storage and can be transmitted in a reasonable amount of time even when transmission bandwidth is limited.

Lossless compression techniques are often to be preferred when compressing digital images that originate as structured document representations produced by computer programs. Examples include the printed or displayed outputs of word processing programs, page layout programs, drawing and painting programs, slide presentation programs, spreadsheet programs, Web client programs, and any number of other kinds of commonly used computer software programs. Such outputs can be, for example, document images rendered from PDL (e.g., PostScript) or document exchange format (e.g., PDF or Common Ground) representations. In short, these outputs are images that are generated in the first instance from symbolic representations, rather than originating as optically scanned versions of physical documents.

Lossy compression techniques can be appropriate for images that do originate as optically scanned versions of physical documents. Such images are inherently imperfect reproductions of the original documents they represent. This is because of the limitations of the scanning process (e.g., noise, finite resolution, misalignment, skew, distortion, etc.). Inasmuch as the images themselves are of limited fidelity to the original an additional loss of fidelity through a lossy compression scheme can be acceptable in many circumstances.

Known encoding techniques that are suitable for lossless image compression include, for example, CCITT Group-4 encoding, which is widely used for facsimile (fax) transmissions, and JBIG encoding, a binary image compression standard promulgated jointly by the CCITT and the ISO. (CCITT is a French acronym for Comité Consultatif International de Télégraphique et Téléphonique. ISO is the International Standards Organization. JBIG stands for Joint Bilevel Image Experts Group.) Known encoding techniques that are suitable for lossy image compression include, for example, JPEG (Joint Photographic Experts Group) encoding, which is widely used for compressing gray-scale and color photographic images, and symbol-based compression techniques, such as that disclosed in U.S. Pat. No. 5,303,313, "METHOD AND APPARATUS FOR COMPRESSION OF IMAGES" (issued to Mark et al. and originally assigned to Cartesian Products, Inc.(Swampscott, Mass.)), which can be used for images of documents containing text characters and other symbols.

As compared with lossy techniques, lossless compression techniques of course provide greater fidelity, but also have certain disadvantages. In particular, they provide lower compression ratios, slower decompression speed, and other performance characteristics that can be inadequate for certain applications, as for example when the amount of uncompressed data is great and the transmission bandwidth from the server or other data source to the end user is low. It would be desirable to have a compression technique with the speed and compression ratio advantages of lossy compression, yet with the fidelity and authenticity that is afforded only by lossless compression.

SUMMARY OF THE INVENTION

The present invention provides a structured document representation that is at once highly expressive and fast and inexpensive to render. According to the invention, symbol-based token matching, a compression scheme that has hitherto been used only for lossy image compression, is used to achieve lossless compression of original document images produced from PDL representations or other structured document representations. A document containing text and graphics is compiled from its original structured representation into a token-based representation (which is itself a structured document representation), and the token-based representation, in turn, is used to produce a rendered pixel image. The token-based representation can achieve high compression ratios, and can be quickly and faithfully rendered without reference to a set of fonts.

In one aspect of the invention, a processor is provided with a first set of digital information that includes a first, resolution-independent structured representation of a document. This first representation is one from which various image collections (e.g., sets of page images) can be obtained, each such image in each such collection having a characteristic resolution. From the first set of digital information, the processor produces a second set of digital information that includes a second, resolution-dependent structured representation of the document. The second structured representation is a lossless representation of a particular one of the image collections obtainable from the first structured representation, and it includes a set of tokens and a set of positions. The second set of digital information is produced by extracting the tokens from the first structured representation, and by determining the positions from the first structured representation. Each extracted token includes pixel data representing a subimage of the particular image collection. Each position is a position of a token subimage in the particular image collection. At least one of the token subimages contains multiple pixels and occurs at more than one position in the image collection. The second set of digital information thus produced can be made available for further use (e.g., distribution, transmission, storage, subsequent reconversion into page images). Applications of the invention include high-speed printing and Internet (World Wide Web) document display.

The invention will be better understood with reference to the drawings and detailed description below. In the drawings, like reference numerals indicate like components.

BRIEF DESCRIPTION OF THE DRAWINGS

FIGS. 16–23 show the tokenized file format in a preferred embodiment, wherein

FIG. 16 shows the format of a dictionary block, including dictionary extensions, FIG. 17 shows the format of a height class, FIG. 18 shows the format of a dictionary clearing section, FIG. 19 shows the format of a position block, including position extensions, FIG. 20 shows the format of a strip, FIG. 21 shows the format of a residual block, FIG. 22 shows the encapsulation of dictionary blocks and pages for a document represented in the tokenized file format of the preferred embodiment, and FIG. 23 shows the position blocks, residual blocks, and other elements of a page of a document in the tokenized file format of the preferred embodiment.

DETAILED DESCRIPTION

Overview

Figure 1:
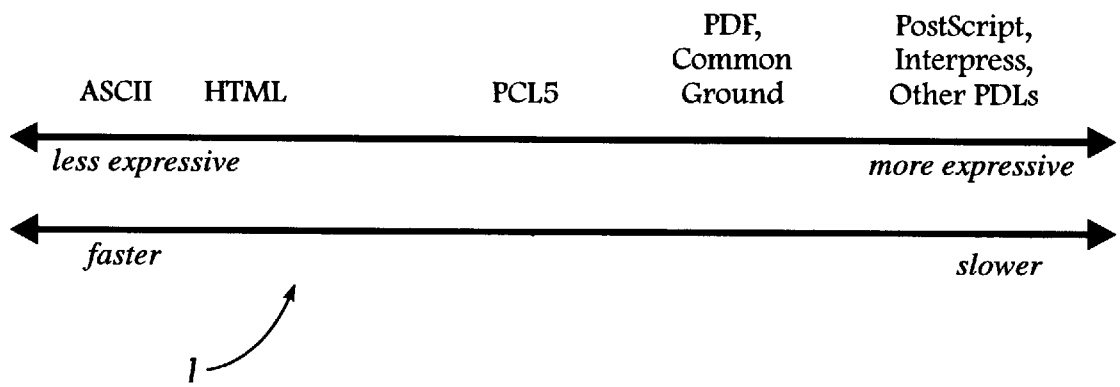
FIG. 1 schematically illustrates the tradeoff between expressiveness versus rendering speed in structured document representations of the PRIOR ART.
Figure 2:
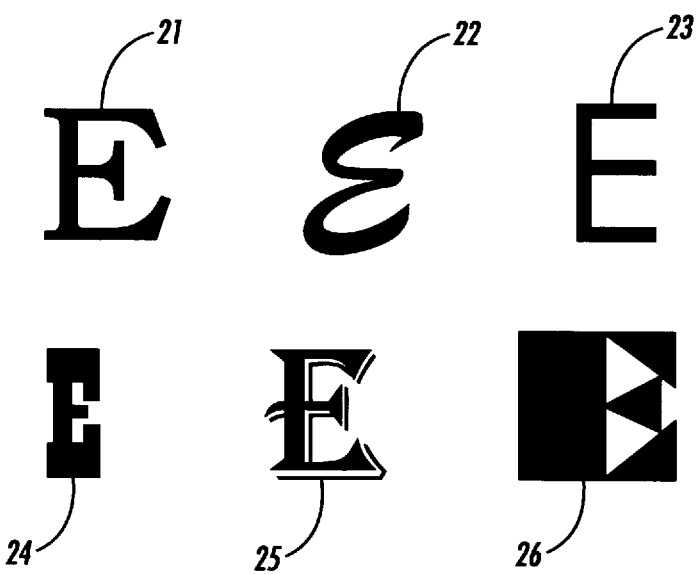
FIG. 2 depicts examples of the letter "E" in different fonts of the PRIOR ART.

According to the invention in a specific embodiment, a richly expressive structured document representation, such as a PostScript or other PDL representation, or PDF or other document exchange language representation, is compiled or otherwise converted into a tokenized file format, such as the DigiPaper format that will be described more fully below. The tokenized representation, in turn, can rapidly be rendered into an unstructured representation of the document image, such as a bitmap or a CCITT Group-4 compressed bitmap, that can be printed, displayed, stored, transmitted, etc.

The PDL or other initial representation of the document is capable of being rendered into page images in different ways, such as with different display or print resolutions or with different font substitutions. For example, a given PostScript file can be printed on two different printers of different resolutions, e.g., a 300 dpi (dots per inch) printer and a 600 dpi printer, and the PostScript interpreter for each printer will automatically rescale to compensate for the different resolutions. As another example, a given PostScript file can be rendered differently by two different printers if the two printers perform different font substitutions. For all its rich expressiveness, then, a PDL representation of a document does not uniquely specify an image of the document to be output on the printer or display screen.

In contrast, in a preferred embodiment the tokenized representation is specific to a particular rendering of the document, that is, a particular page image or set of page images at a particular resolution. Also, the tokenized representation has no notion of font, and does not rely on fonts in order to be converted into printable or displayable form.

Thus, in a preferred embodiment, the inventive method contemplates automatic conversion by a computer or other processor of an initial resolution-independent, structured document description, one that does not define a unique visual appearance of the document, into a resolution-dependent structured document description that does define a unique visual appearance of the document. This image-based, resolution-dependent description guarantees fidelity: Whereas a set of page images must be generated anew each time a PDL document is rendered for display, print, or other human-readable media, with the DigiPaper representation, a set of page images is generated once, up front, and then is efficiently and losslessly represented in a structured format that can be stored, distributed, and so forth. DigiPaper maintains the expressiveness of the original PDL representation, without being subject to the unpredictability of rendering that is inherent in a non-image-based representation. Moreover, a DigiPaper representation of a document can be converted into final output form more quickly and with less computational overhead than its PDL counterpart.

Although the DigiPaper tokenized representation is image-based, it is nevertheless a structured document representation; it is not merely a sequence of bits, bytes, or run-lengths. In this respect, DigiPaper differs from a raster (e.g., bitmap) image, a CCITT-4 compressed image, or the like. Moreover, in contrast with unstructured representations, DigiPaper achieves better image compression ratios. For example, DigiPaper typically achieves 2 to 20 times greater compression than can be achieved using a TIFF file format with CCITT Group-4 compressed image data, and offers a compression ratio with respect to the raw, uncompressed image data of as much as a 100 to 1. (TIFF, an abbreviation for Tagged Image File Format, is a trademark formerly registered to Aldus Corp. of Seattle, Wash., and is now claimed by Adobe Systems, Inc., Mountain View, Calif., with whom Aldus has since merged). Indeed, a DigiPaper file can be approximately the same size as the PDL file from which it is produced.

Because DigiPaper offers rapid, predictable rendering, guaranteed fidelity, and good data compression, it is well suited for a wide variety of printing and display applications. Thus the method for converting a document from a PDL or other structured document representation into a DigiPaper tokenized representation according to the invention is a method of wide utility.

Figure 3:
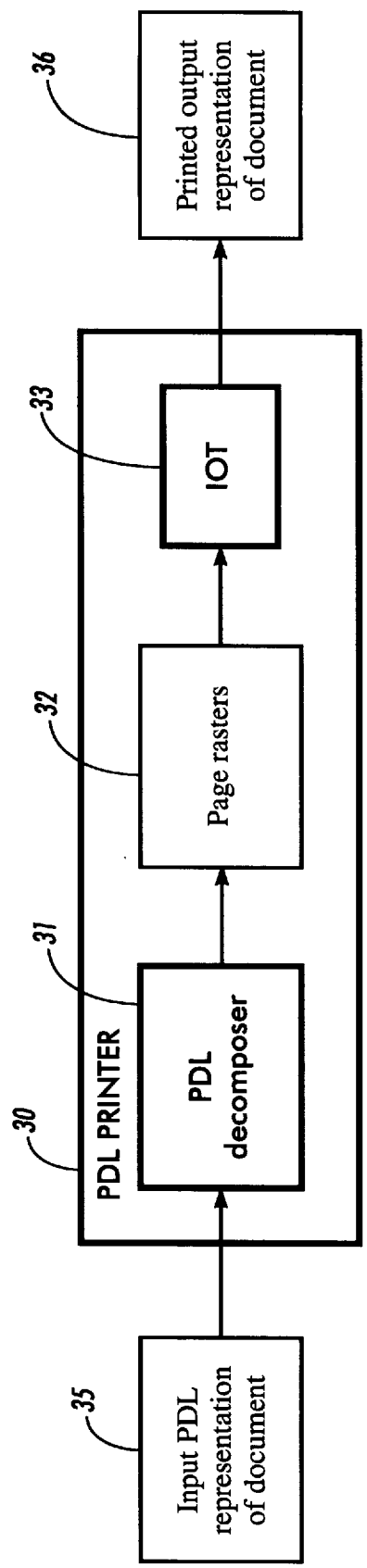
FIG. 3 schematically illustrates a printer for printing a document from an input page description language file in the PRIOR ART.

As one example, the invention can be used to improve the throughput of a printer, such as a laser printer, ink-jet printer, or the like, by eliminating the rendering speed bottleneck inherent in PDL printers of the prior art (see discussion of printer 30 in connection with FIG. 3, above). The bottleneck can be eliminated because DigiPaper files can be decoded quickly, at predictable speeds. Speeds of about 5 pages per second have been achieved on a Sun SPARC-20 workstation using 600 dpi images.

Other examples of use of the invention will be described later on.

Compression-Decompression Cycle

Figure 4:
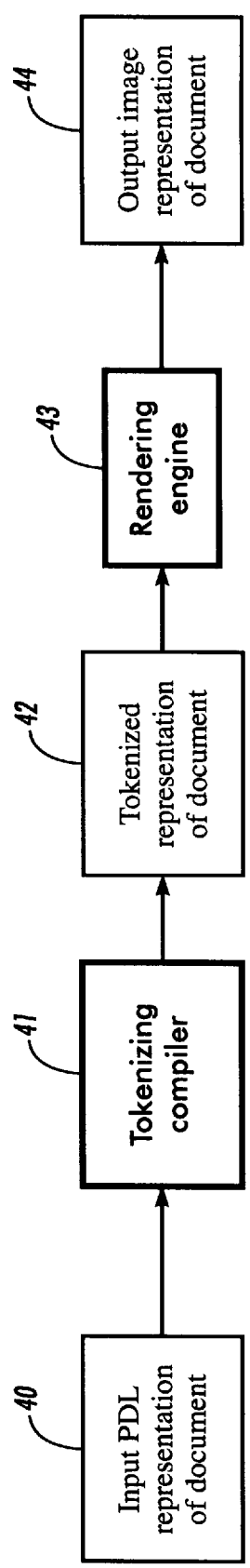
FIG. 4 shows the overall sequence of transformations applied to a structured document representation in a complete compression-decompression cycle according to the invention.

FIG. 4 illustrates the overall sequence of transformations applied to a structured representation of a document in a complete compression-decompression cycle according to the invention in the specific embodiment. The document to be transformed is assumed to be one that can be rendered as a set of one or more binary images, such as a document containing black-and-white text and graphics. A PDL representation 40 of the document, such as a PostScript file, is input to a tokenizing compiler 41, which produces a tokenized representation 42 of the document. The tokenized representation 42, in turn, is input to a rendering engine 43 that produces an output binary image 44.

Tokenizing compiler 41 is also called a compressor, and tokenized representation 42 is also called a compressed representation. Tokenized representation 42 is compressed in the sense that it is smaller than the output bitmap 44. (Tokenized representation 42 can be comparable in size to PDL representation 40.) The production of a tokenized document representation from an input PDL document representation (e.g., the production of tokenized representation 42 from input PDL representation 40) is thus called the compression phase of the transformation sequence, and the production of an output image from the tokenized representation (e.g., the production of output binary image 44 from tokenized representation 42) is called the decompression phase of the sequence.

FIG. 5 again shows PDL representation 40 being input to tokenizing compiler 41 and tokenized representation 42 being produced thereby. Here, tokenizing compiler 41 is illustrated in greater detail. In this embodiment, tokenizing compiler 41 begins by processing input PDL representation 40 through a PDL decomposer 45 to produce one or more page images 46. PDL decomposer 45 is of the kind ordinarily used to turn PDL files into output images in known printers and displays; for example, for a PostScript input file 40, PDL decomposer 45 can be implemented as a PostScript interpreter program executed by a processor. The page images 46 are bitmaps, or compressed bitmaps, that represent the pages of the document. In a conventional printer or visual display, the bitmaps 46 would be output to drive, respectively, the IOT or display monitor. Here, however, according to the invention, page images 46 are compressed by a tokenizer or compressor 47. Compressor 47 takes the page images and constructs a DigiPaper or other tokenized data stream or file, which compressor 47 can then store, transmit, or otherwise make available for further processing. Thus, the output of compressor 47 is tokenized representation 42.

Compressor 47 can be implemented as a software program executed by a processor. The steps by which compressor 47 can perform the tokenization (compression) in this embodiment are described below with reference to FIG. 14 and the accompanying text. The DigiPaper file format, which is the preferred form for tokenized representation 42 in this embodiment, and thus the preferred form for the output of compressor 47, is described in detail below with reference to FIGS. 16–23 and the accompanying text in numbered sections 1 through 8.

Figure 5:
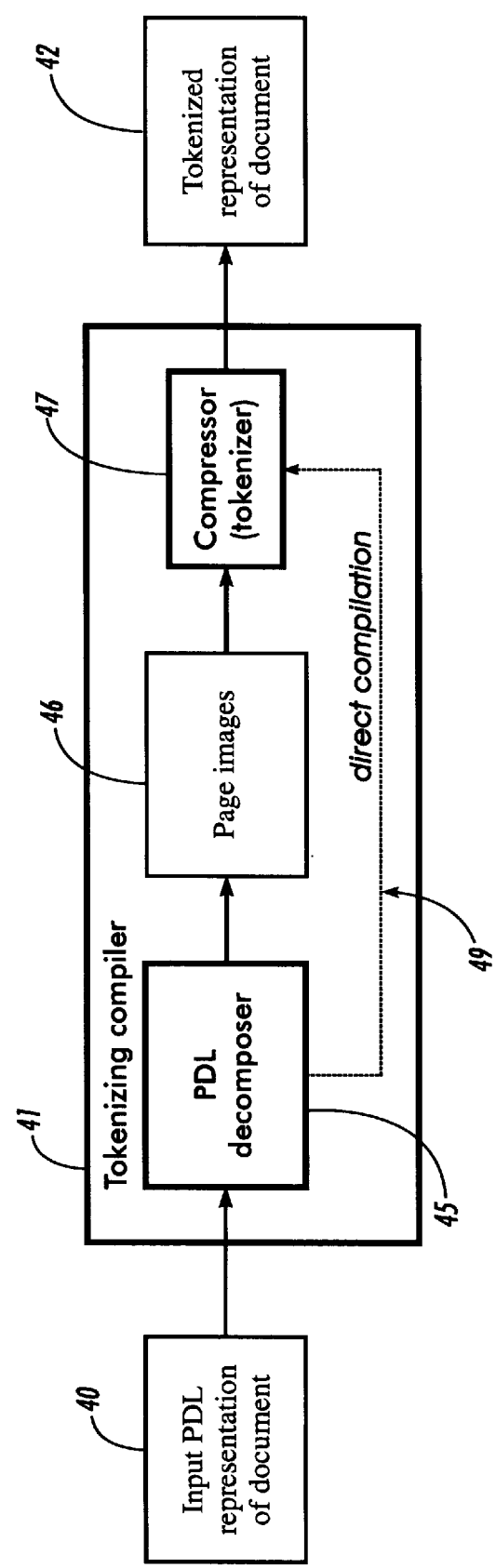
FIG. 5 schematically illustrates a compressor for converting an input page description language file into a tokenized representation, showing in more detail the transformations applied to a structured document representation in the compression phase of FIG. 4.

Also shown in FIG. 5 is an alternative way of producing tokenized representation 42. According to this alternative, tokenizing compiler 41 is designed so that PDL decomposer 45 is not a standard PDL decomposer, but instead is closely coupled to compressor 47, so that no intermediate page images 46 are produced. This alternative can be called direct compilation of input PDL description 40 into tokenized representation 42. It is illustrated by arrow 49.

Figure 6:
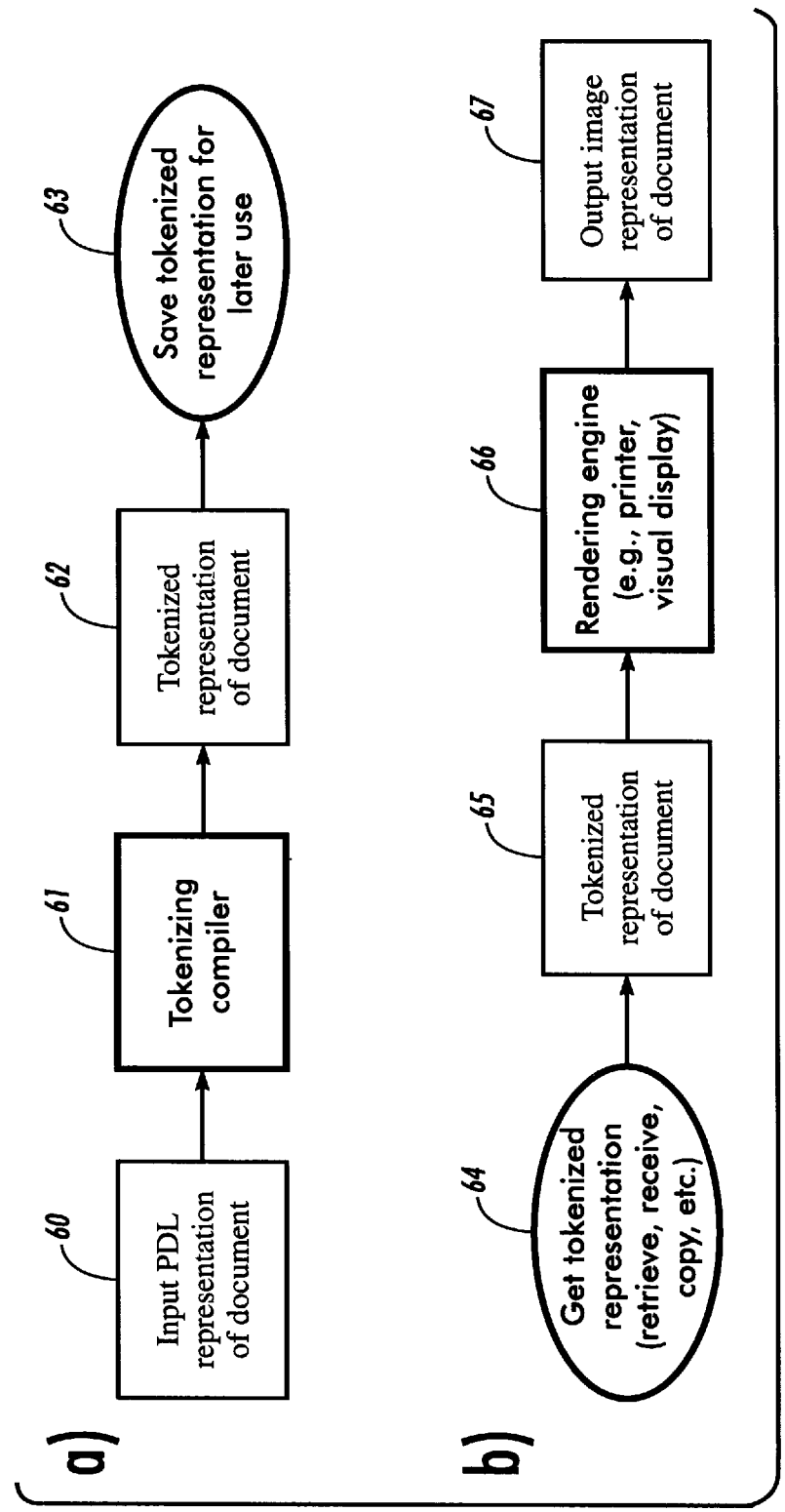
FIG. 6 is a series of views showing how the compression and decompression phases can be decoupled from one another.

The series of two views in FIG. 6 shows that the compression and decompression phases of the transformation sequence of FIG. 4 can be decoupled from one another. In view (a), the compression phase takes place. A PDL document description 60 is input to a tokenizing compiler 61 to produce a tokenized representation 62. The tokenized representation 62 is then saved for later use at 63. For example, tokenized representation 62 can be stored in a file on a hard disk or other persistent storage medium, either locally or remotely to the processor that performs the tokenization. As another example, tokenized representation 62 can be transmitted from wherever it is generated to another location. In particular, tokenized representation 62 can be generated by a computer and transmitted across a local-area or wide-area computer network to another computer, such as a print server or file server, or to a hardcopy output device, such as a printer or a multifunction device. In still another example, tokenized representation 62 can be replicated and disseminated. For example, tokenized representation 62 can be transmitted across a computer network, such as the. Internet, to a server computer, and cached there; thereafter, copies of tokenized representation 62 can be called up from the server cache by remote clients.

In view (b) of FIG. 6, the decompression phase takes place. Tokenized representation 65 is obtained at 64 by a device that will perform the decompression and output. For example, tokenized representation 65 can be retrieved from storage, received across a computer network or by telephone (modem), or copied from another tokenized representation. Tokenized representation 65 is input to a rendering engine 66, which outputs the document as a page image or set of page images that are or can be displayed, printed, faxed, transmitted by computer network, etc.

In this example, although tokenized representation 65 of the decompression phase (b) can be identified with tokenized representation 62 of the compression phase (a), it need not be so identified. Tokenized representation 65 can also be, for example, one of any number of copies of tokenized representation 62 made and distributed ahead of time. As another example, tokenized representation 65 can be a representation of some document other than the one used to produce tokenized representation 62. In any event, tokenized representation 65 is preferably a representation that has been created (i.e., compressed) from an image or set of images whose resolution matches the output resolution of rendering engine 66.

Further examples of how a tokenized representation can be saved for later use (as at 63) and then obtained for use (as at 64) are described below with reference to FIGS. 9–10 and the accompanying text.

Certain advantages obtain by decoupling the compression and decompression phases as illustrated in FIG. 6. In particular, for printing applications, the computationally expensive and unpredictably long task of decomposing PDL can be done ahead of time (e.g., off-line by a dedicated server). Then the printer need only decompress the DigiPaper tokenized format, which can be done quickly and efficiently and at predictable speeds. Accordingly, the printer can be made faster and, at the same time, less expensive, since its computing hardware can be less powerful than what is required for a conventional PDL printer.

Figure 7:
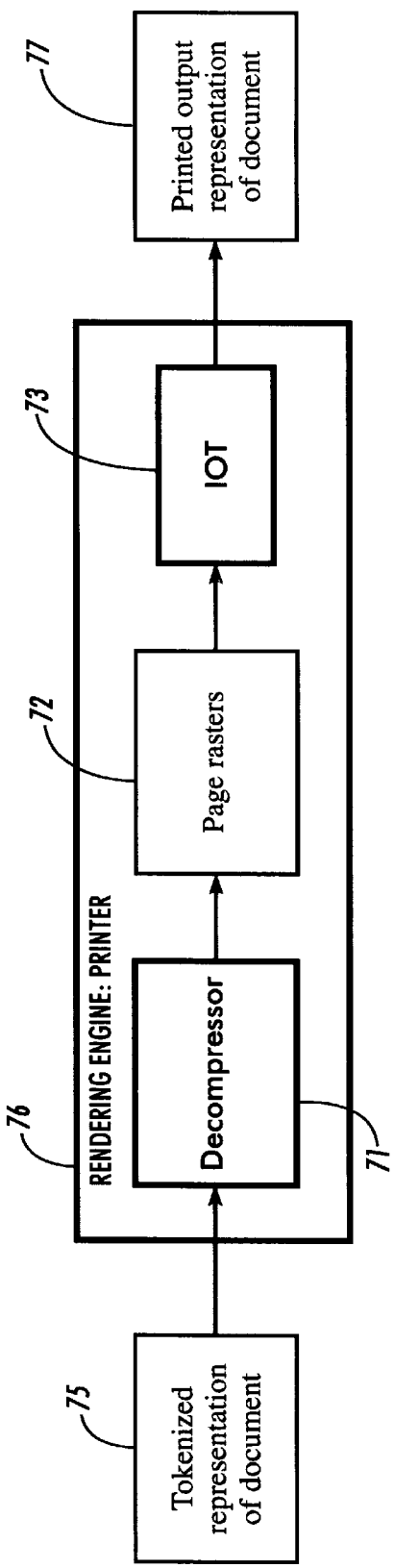
FIG. 7 schematically illustrates a printer for printing a document from a tokenized representation.
Figure 8:
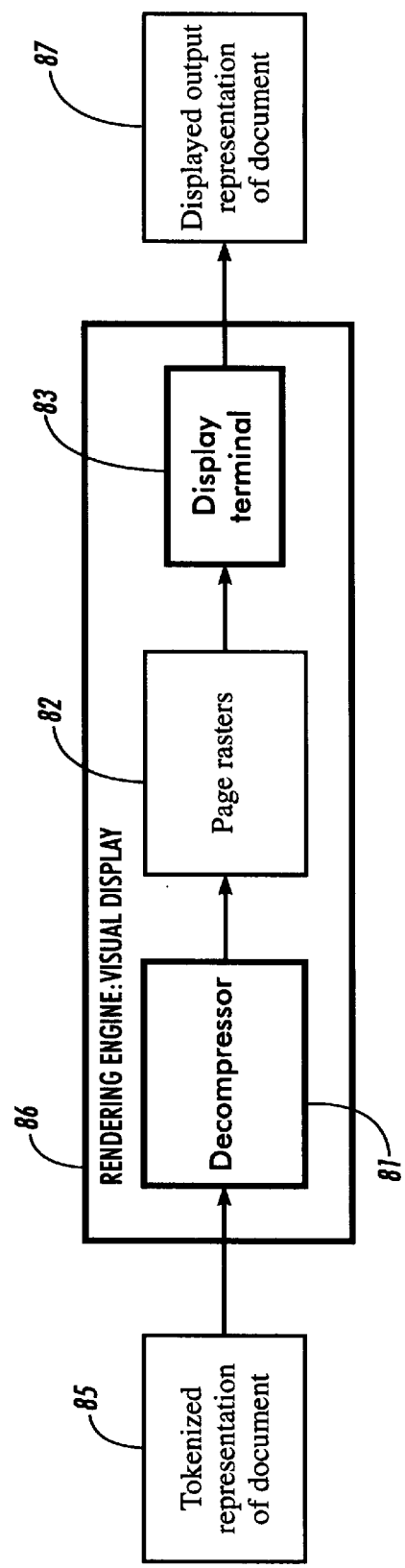
FIG. 8 schematically illustrates a display viewer for displaying a document from a tokenized representation.

Some examples of rendering engines suitable for use as rendering engine 66 are shown in FIGS. 7–8. FIG. 7 schematically illustrates a printer 76 that can print a document from a tokenized representation, such as a DigiPaper file. Printer 76 is an example of the bottleneck-free printer mentioned earlier. It is designed to accept an input tokenized representation, such as tokenized representation 75, and convert that representation to printed output. It need not have an on-board PDL decomposer, and its on-board computing power can accordingly be quite modest. Printer 76 works by decompressing input tokenized representation 75 with a decompressor 71. Decompressor 71 can be, for example, an on-board processor executing decompression software. Alternatively, it can be implemented in dedicated hardware. Decompressor 71 produces a set of one or more raster images 72, one for each page of the printed document. The raster images are provided to a conventional IOT 73, which produces printed output 77.

FIG. 8 schematically illustrates a visual display 86 that can display a document given an input tokenized representation, such as a DigiPaper file. It is similar in concept to printer 76. Display 86 accepts an input tokenized representation, such as tokenized representation 85, and decompresses it with a decompressor 81. Decompressor 81 produces a set of one or more raster images 82, one for each page of the printed document. The raster images can be produced all at once, or on an as-needed basis, according to the available display memory and other constraints on the environment in which display 86 operates. The raster images are provided to a display terminal 83, such as a cathode-ray tube (CRT) or flat-panel monitor screen, which produces output that can be read by a human being.

Like printer 76, display 86 need not have an on-board PDL decomposer. Thus, for example, if display 86 is included as part of a personal computer or other general-purpose computer, the processor (CPU) of the computer need not expend much computing power in order to keep display 86 supplied with pixels. This can be advantageous, for example, when display 86 is rendering documents received from afar, such as World Wide Web pages.

Although the rendering engine examples 76, 86 shown in FIGS. 7–8 produce output images that are immediately visible as printed or displayed pages, other rendering engines can produced other kinds of image output. In particular, the output from a rendering engine suitable for use as rendering engine 66 can be an encoded bitmap (e.g., a CCITT Group-4 transmission to be received by a remote fax or multifunction device) or other unstructured document format.

The steps by which decompressors, such as decompressor 71 and decompressor 81, can perform the decompression in this embodiment are described below with reference to FIG. 15 and the accompanying text.

System Components

Figure 9:
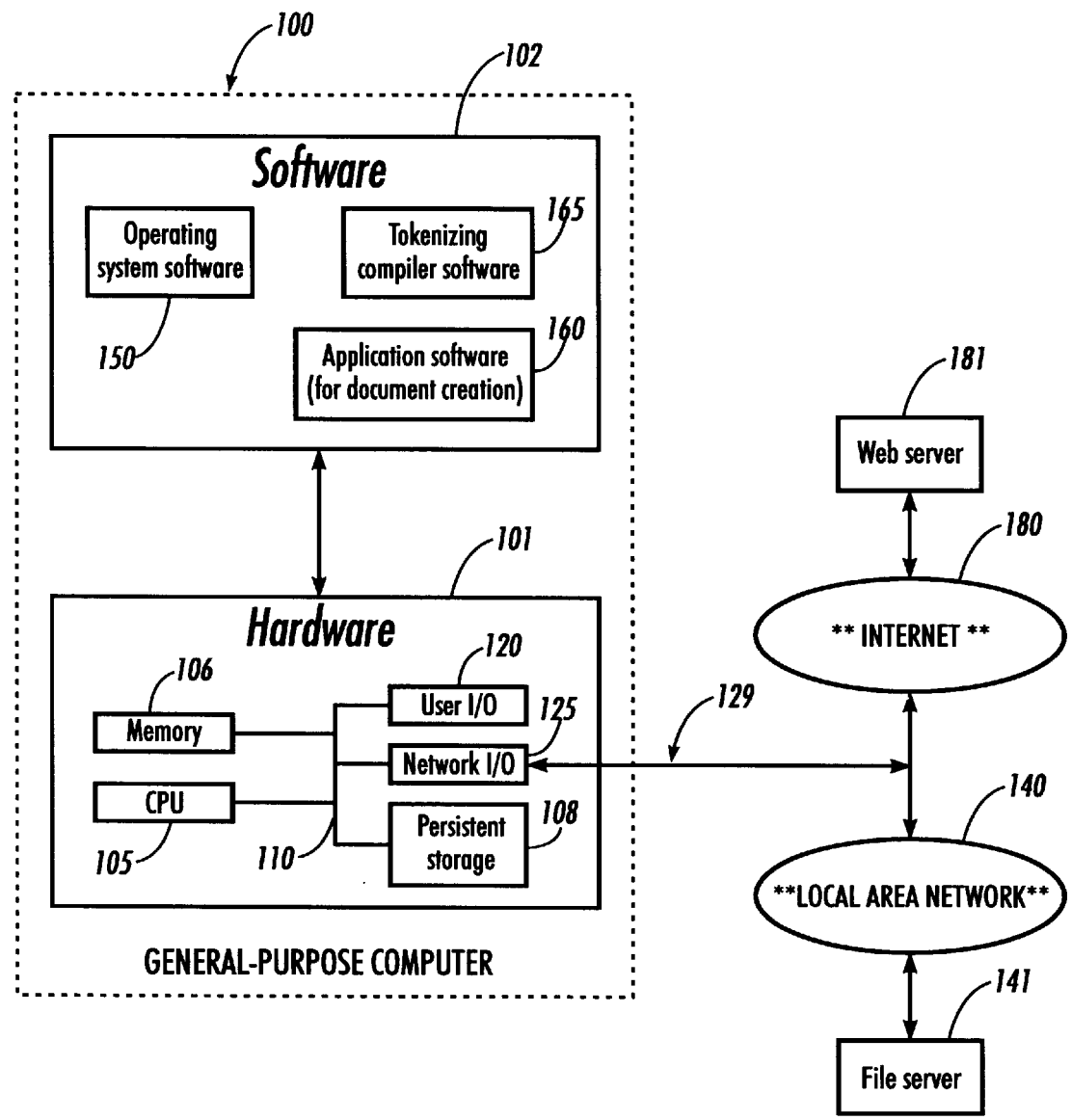
FIG. 9 shows hardware and software components of a system suitable for converting a structured representation of a document into a tokenized representation of the document.

FIG. 9 shows hardware and software components of an exemplary system suitable for performing the compression phase of the transformation sequence of FIG. 4. The system of FIG. 9 includes a general-purpose computer 100 connected by one or more communication pathways, such as connection 129, to a local-area network (LAN) 140 and also to a wide-area network, here illustrated as the Internet 180. Through LAN 140, computer 100 can communicate with other local computers, such as a file server 141. Through the Internet 180, computer 100 can communicate with other computers, both local and remote, such as World Wide Web server 181. As will be appreciated, the connection from computer 100 to Internet 180 can be made in various ways, e.g., directly via connection 129, or through local-area network 140, or by modem (not shown).

Computer 100 is a personal or office computer that can be, for example, a workstation, personal computer, or other single-user or multi-user computer system; an exemplary embodiment uses a Sun SPARC-20 workstation (Sun Microsystems, Inc., Mountain View, Calif.). For purposes of exposition, computer 100 can be conveniently divided into hardware components 101 and software components 102; however, persons of skill in the art will appreciate that this division is conceptual and somewhat arbitrary, and that the line between hardware and software is not a hard and fast one. Further, it will be appreciated that the line between a host computer and its attached peripherals is not a hard and fast one, and that in particular, components that are considered peripherals of some computers are considered integral parts of other computers. Thus, for example, user I/O 120 can include a keyboard, a mouse, and a display monitor, each of which can be considered either a peripheral device or part of the computer itself, and can further include a local printer, which is typically considered to be a peripheral. As another example, persistent storage 108 can include a CD-ROM (compact disc read-only memory) unit, which can be either peripheral or built into the computer.

Hardware components 101 include a processor (CPU) 105, memory 106, persistent storage 108, user I/O 120, and network interface 125. These components are well understood by those of skill in the art and, accordingly, need be explained only briefly here.

Processor 105 can be, for example, a microprocessor or a collection of microprocessors configured for multiprocessing. It will be appreciated that the role of computer 100 can be taken in some embodiments by multiple computers acting together (distributed computation); in such embodiments, the functionality of computer 100 in the system of FIG. 9 is taken on by the combination of these computers, and the processing capabilities of processor 105 are provided by the combined processors of the multiple computers.

Memory 106 can include read-only memory (ROM), random-access memory (RAM), virtual memory, or other memory technologies, singly or in combination. Persistent storage 108 can include, for example, a magnetic hard disk, a floppy disk or other persistent read-write data storage technologies, singly or in combination. It can further include mass or archival storage, such as can be provided by CD-ROM or other large-capacity storage technology. (Note that file server 141 provides additional storage capability that processor 105 can use.)

User I/O (input/output) hardware 120 typically includes a visual display monitor such as a CRT or flat-panel display, an alphanumeric keyboard, and a mouse or other pointing device, and optionally can further include a printer, an optical scanner, or other devices for user input and output.

Network I/O hardware 125 provides an interface between computer 100 and the outside world. More specifically, network I/O 125 lets processor 105 communicate via connection 129 with other processors and devices through LAN 140 and through the Internet 180.

Software components 102 include an operating system 150 and a set of tasks under control of operating system 150, such as an application program 160 and, importantly, tokenizing compiler software 165. Operating system 150 also allows processor 105 to control various devices such as persistent storage 108, user I/O 120, and network interface 125. Processor 105 executes the software of operating system 150 and its tasks 160, 165 in conjunction with memory 106 and other components of computer system 100.

Software components 102 provide computer 100 with the capability of serving as a tokenizing compiler according to the invention. This capability can be divided up among operating system 150 and its tasks as may be appropriate to the particular circumstances.

In FIG. 9, the tokenizing capability is provided primarily by task 165, which carries out a tokenizing compilation of an input PDL document according to the steps described below with reference to FIG. 14 and the accompanying text. The input PDL document can be provided from any number of sources. In particular, it can be generated as output by application program 160, retrieved from persistent storage 108 or file server 141, or downloaded from the Internet 180, e.g., from Web server 181.

Figure 10:
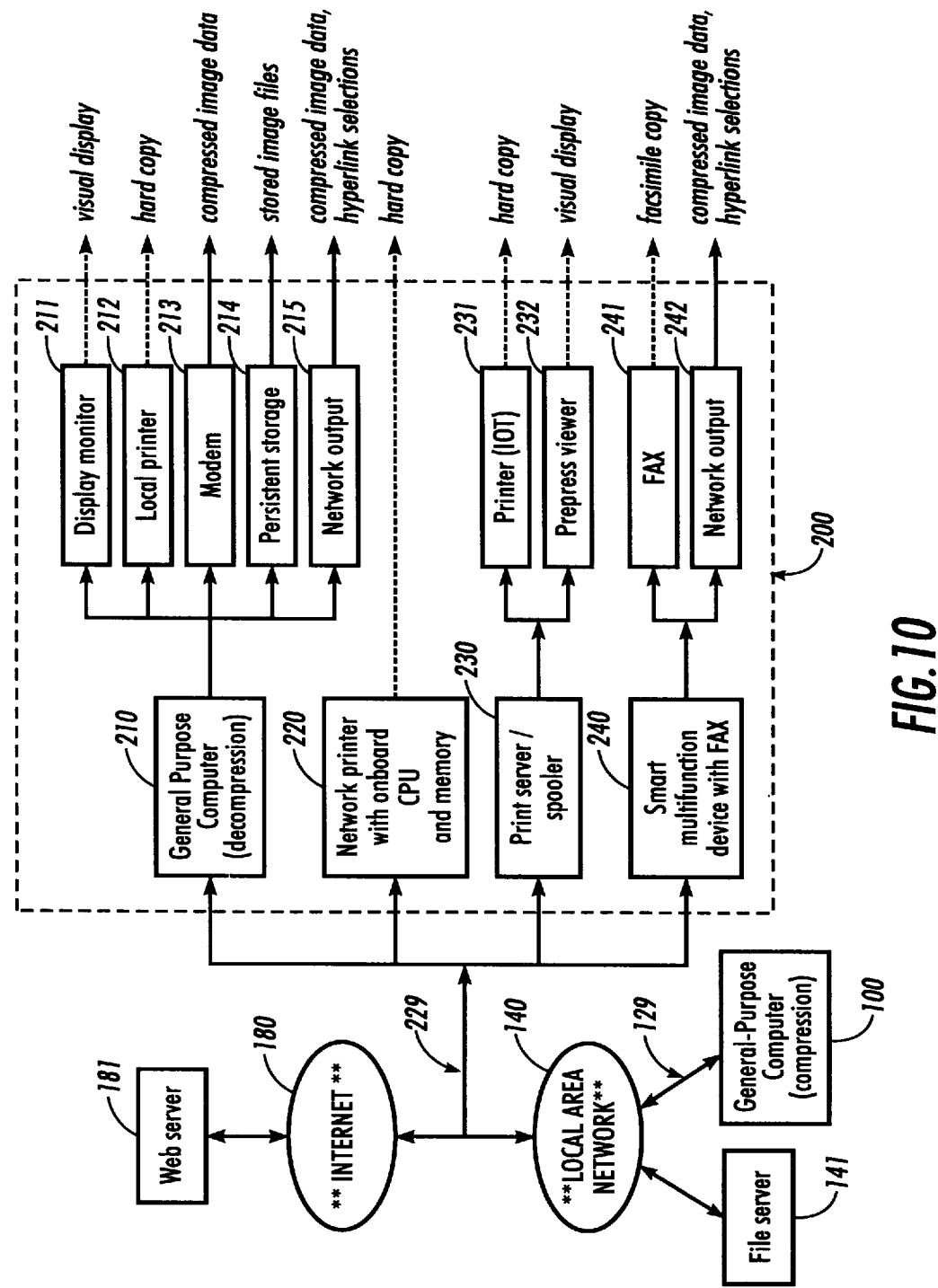
FIG. 10 shows a system including components suitable for converting a tokenized representation of a document into rendered images, such as printable or displayable page images.

FIG. 10 shows a system in which the decompression phase of the transformation sequence of FIG. 4 can be performed in a variety of ways. The exemplary system of FIG. 10 is illustrated as a superset of the system of FIG. 9; in particular, it includes computer 100, file server 141, web server 181, LAN 140 and the Internet 180. Further, the system of FIG. 10 adds various system components 200 that can be used to render tokenized representations of documents. Components 200 include a second general purpose computer 210, a network printer 220, a print server 230, and a "smart" multifunction device 240.

In operation of the system of FIG. 10, a document that has previously been converted from a PDL representation to a tokenized representation (e.g., a document produced by tokenizing compiler 165 in computer 100; a document from file server 141 or Web server 181) is made available via a network connection 229 to one or more of components 210, 220, 230, 240. Each of these components can serve as a rendering engine and, in particular, as a decompressor. Each is assumed to include communications software enabling the processor to obtain a tokenized representation of a document, and decompression software enabling the processor to turn that tokenized representation into image data suitable for a particular form of output. The decompression software can be resident in the component, or can be downloaded along with the tokenized representation from LAN 140 or the Internet 180 via connection 229.

Computer 210 can be a general-purpose computer with characteristics and hardware components similar to those of computer 100; an exemplary embodiment uses a Sun SPARC-20 workstation. Also like computer 100, computer 210 has software that includes an operating system controlling one or more tasks. However, whereas computer 100 has compression software, computer 210 has decompression software. That is, the software of computer 210 includes software that itself renders the processor of computer 210 capable of decompressing the tokenized representation, or else includes network client software that the processor can execute to download the decompression software, which in turn can be executed to decompress the tokenized representation. (Note that a computer can, of course, have both compression and decompression software loaded into its memory, and that in some cases, a single computer can act as both compression computer 100 and decompression computer 210.)

Computer 210 is shown connected to a display monitor 211, a local printer 212, a modem 213, a persistent storage device 214, and network output hardware 215. Computer 210 can control these devices and, in particular, can run decompression software appropriate for each of them.

For example, by executing decompression software appropriate for display monitor 211, the processor of computer 210 can cause a tokenized representation to be decompressed into a form that display monitor 211 can display. Thus computer 210 and display monitor 211 together serve as a rendering engine for visual display. Similarly, computer 210 and local printer 212 can render the tokenized representation of the document as hardcopy output. Local printer 212 can be a "dumb" printer, with little or no on-board computing hardware, since computer 210 does the work of decompression.

Further, computer 210 can render the document image(s) in forms not immediately readable by a human being, but useful nonetheless. Computer 210 can run decompression software that outputs image data in unstructured (e.g., CCITT Group-4) compressed format, which can be transmitted across telephone lines by modem 213. Computer 210 can also output uncompressed or compressed image data to persistent storage 214 for later retrieval, and can output uncompressed or compressed image data to network output device 215 for transmission elsewhere (e.g., to another computer in LAN 140 or the Internet 180). If the decompressed document includes hypertext links or other annotations, as described below, computer 210 can interpret a user's indicated selections of such annotations and can transmit these selections across the network along with the image data.

Network printer 220 is a printer that has its own on-board computing hardware, including a CPU and memory. Therefore, unlike local printer 212, network printer 220 can perform its own decompression without the aid of a host computer or server. Network printer 220 is thus a full-fledged rendering engine, capable of turning tokenized input files into hardcopy output. In this respect, it is like printer 76 that was shown in FIG. 7.

Continuing in FIG. 10, print server 230 is a computer that can control "dumb" printers and that can be used for temporary storage of files to be printed by such printers. Whereas general-purpose computer 210 is assumed to be a computer that is used interactively by a human user, print server 230 is a computer used primarily for controlling printers and print jobs. Its processor executes decompression software to produce images that can be sent to IOT 231 for immediate printout, sent to a prepress viewer 232 for preliminary inspection prior to printing, or spooled (temporarily stored) in persistent storage of print server 230 for later printing or prepress viewing.

Multifunction devices are a class of standalone devices that offer a combination of printing, copying, scanning, and facsimile functions. Multifunction 240 is assumed to be a "smart" device, having its own processor and memory, with sufficient computing power to decompress its own tokenized files without assistance from a host computer or server. Here, it is shown providing output to the network via network output device 242; if a multifunction device 240 has software to support a paper user interface, the output data can include hypertext link selections or other information in addition to the image data. Multifunction device 240 is also shown providing compressed image data to a facsimile machine 241. For example, multifunction device 240 can contact facsimile machine 241 by ordinary telephone, and send it compressed image data in CCITT Group-4 format. Facsimile machine 241 receives the fax transmission from multifunction device 240 as it would any other fax transmission, and prints out a copy of the document.

Persons of skill in the art will appreciate that the systems of FIGS. 9–10 are intended to be illustrative, not restrictive, and that a wide variety of computational, communications, and information and document processing devices can be used in place of or in addition to what is shown in FIGS. 9–10. For example, connections through the Internet 180 generally involve packet switching by intermediate router computers (not shown), and computer 210 is likely to access any number of Web servers, including but by no means limited to computer 100 and Web server 181, during a typical Web client session.

Tokenized Representations

In a preferred embodiment, the tokenized document representation produced by the tokenizing compiler is organized in the DigiPaper format that will be described below with reference to FIGS. 16–23. To ease the understanding of the details of the DigiPaper format, some simplified tokenized formats will first be considered with reference to FIGS. 11–13. These simplified formats are presented for purposes of illustrating certain ideas that are basic to the tokenized representations used in the invention, including but not limited to DigiPaper.

Figure 11:
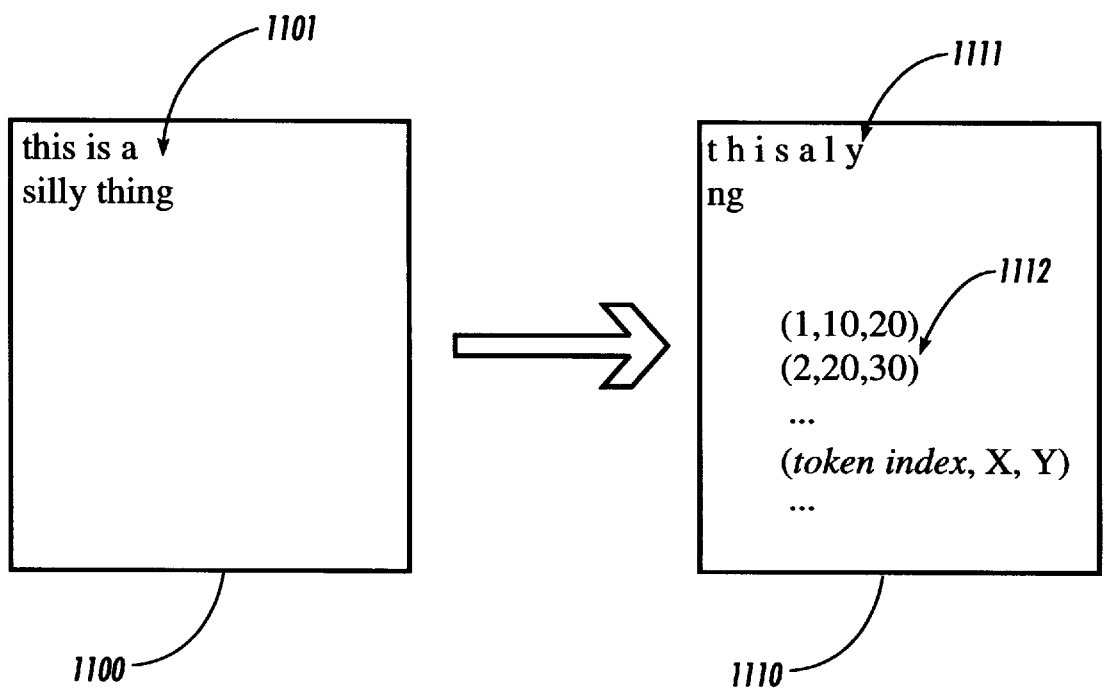
FIG. 11 illustrates the tokens and positions in an exemplary, highly simplified tokenized file format.

FIG. 11 illustrates the concepts of tokens and positions through a highly simplified example. A one-page input document, whose image 1100 is shown, includes text 1101. The document can be transformed into a tokenized representation 1110. Tokenized representation 1110 includes a set (or dictionary) of tokens 1111 and a set of positions 1112.

Each of the tokens 1111 represents a shape that occurs somewhere in the document. Each token's shape is stored as a bitmap. Each of the positions 1112 represents where one of the tokens is to be placed, that is, where the token's shape occurs in the document. For example, the shape "t," which is associated with the first token, appears at a position whose (X, Y) coordinates are given by the ordered pair (10, 20). The shape "h," which is associated with the second token, appears at a position whose (X, Y) coordinates are given by the ordered pair (20, 30). In general, each of the positions 1112 includes a token index, that is, an index indicating a particular one of the tokens 1111, together with an (X, Y) coordinate pair that tells where the indicated token's shape occurs in the document.

To generate the tokenized representation 1110 from the document image 1100, a computer can detect the different shapes that appear in the document image and note where they appear. For example, scanning from left to right beginning with the first line of text 1101, the computer first finds the shape "t", then the shape "h", then the shape "i", then the shape "s." The computer records each of these shapes as tokens 1111, and records their respective positions as positions 1112. Continuing rightward, the computer next finds another "i"; since this shape is already in the dictionary, the computer need only record its position. The computer continues its procedure until the entire document image has been scanned. In short, the computer can tokenize the image by finding each shape in turn, determining whether that shape is already in the token dictionary, adding it to the dictionary if not and, in any case, storing its position in the set of positions.

To reconstruct the image 1100 from the tokenized representation 1110, a computer can read sequentially through the positions 1112 and, for each position, transfer the shape of the token whose index is listed to the listed (X, Y) coordinate. Thus, in reconstructing the image 1100, a computer will reuse the first token (the shape "t") twice, the second token (shape "h") twice, the third token (shape "i") four times, etc. Generally, the more often a token's shape appears in a document, the greater the compression ratio obtainable through the tokenized representation.

Note that the set of tokens 1111 is not a font. A tokenized representation of a document according to the invention includes no notions of semantic labeling or of character sets, no encoding or mapping of sets of character codes to sets of character names. The shapes "t", "h", "i" and so forth are treated as just shapes, that is, particular bitmaps, and not as letters of an alphabet or members of a larger set of character codes. The shapes appear in the dictionary in the order in which they first appear in document image 1101, not in any fixed order. The shapes that appear in the document dictate what will be in the dictionary, and not the other way around.

Any shapes that occur repeatedly in the document can be used as token shapes, including shapes that have no symbolic meaning at all. The shapes that make up text 1101 in document image 1100 happen to be recognizable to English-speaking humans as alphabetic characters, but they could just as well be cuneiform characters or meaningless squiggles, and the tokenizer would process them in the same way. Conversely, a given letter of the alphabet that is to be rendered as two distinct shapes (e.g., at two different sizes or in two different typefaces) will be assigned two different tokens, one for each distinct shape in which that letter appears.

For a one-page document image such as image 1100, it is not necessary to encode page information in the tokenized representation. For multi-page images of longer documents, the tokenized representation should include information about which token shapes appear on which pages. To this end, a separate set of positions can be maintained for each page of the document. Typically with tokenized representations, higher compression ratios are obtained for multi-page documents, because the longer the document, the more often each token can be reused.

Figure 12:
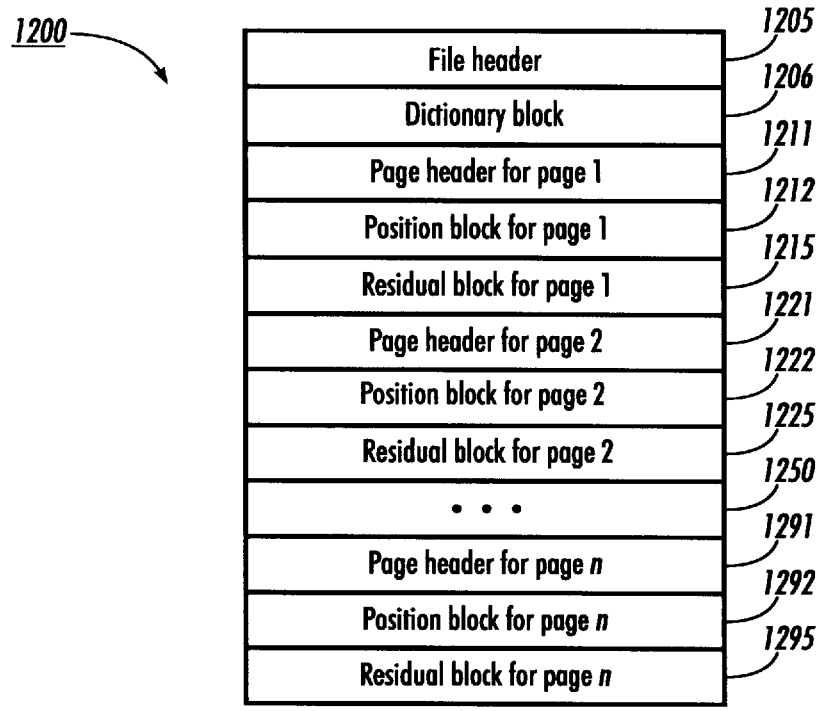
FIG. 12 is a diagram of the encapsulation of dictionary blocks and pages (including position blocks and residual blocks) for a document represented in an exemplary, simplified, noninterleaved tokenized file format.

FIGS. 12 and 13 illustrate, again in simplified fashion, some different possibilities for multi-page tokenization formats. FIG. 12 shows a tokenized representation (also called an encapsulation) 1200 of a document whose rendered image is n pages long. Tokenized representation 1200 begins with file header 1205 and dictionary block 1206, which contains the tokens and their shapes. Thereafter come sequences of blocks for the pages of the multi-page document image. Blocks 1211, 1212, and 1215 pertain to page 1; 1221, 1222, and 1225 pertain to page 2; and so forth throughout the remaining pages (as represented by ellipsis 1250) including blocks 1291, 1292, and 1295, which pertain to page n.

For each page of representation 1200, there is a page header block, a position block, and a residual block. For example, block 1211 is the header block for page 1; block 1212 is the position block for page 1; and block 1215 is the residual block for page 1. The page header block indicates the beginning of a new page, and can contain additional page-specific information. The position block records which tokens are to be placed at which positions of the current page. The residual block stores the shapes, if any, that appear on this page and that are not in the token dictionary, such as shapes that appear only once in the document.

Figure 13:
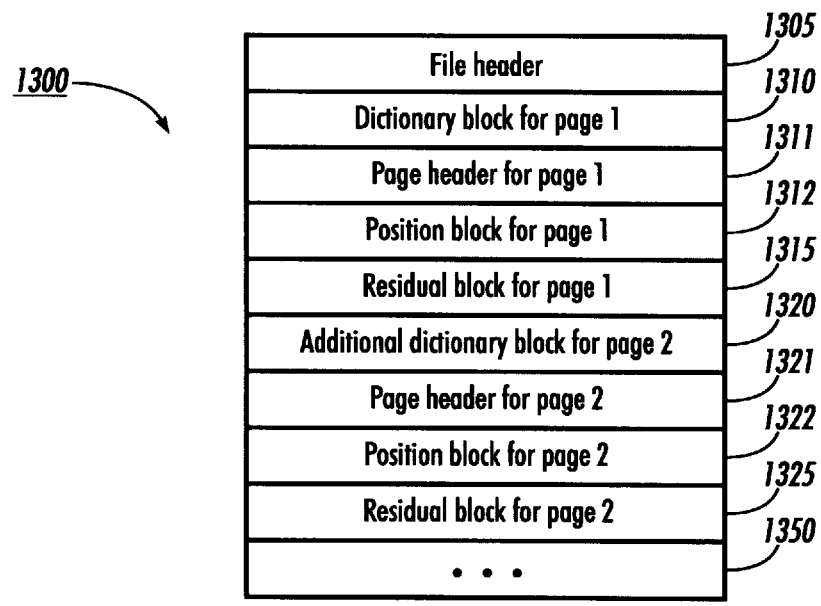
FIG. 13 is a diagram of the encapsulation of dictionary blocks and pages (including position blocks and residual blocks) for a document represented in an exemplary, simplified, interleaved tokenized file format.

FIG. 13 shows a tokenized representation 1300 of a multi-page document. Only the first two pages are shown, the remainder of the document being indicated by ellipsis 1350. The format is similar to that of tokenized representation 1200 in FIG. 12, except that there can be dictionary blocks interleaved throughout the file. Tokenized representation 1300 begins with file header 1305, followed by a dictionary block 1310, page header 1311, position block 1312, and residual block 1315 for page 1. Dictionary block 1310 includes all the shapes that appear on page 1 of the document image. Thereafter, tokenized representation 1300 continues at page 2 with an additional dictionary block 1320, followed by page header 1321, position block 1322, and residual block 1325 for page 2. Dictionary block 1320 includes all the shapes that first appear on page 2 of the document image, that is, the shapes that were not needed in order to render page 1 but that are needed to render page 2. Accordingly, these new shapes are added to the dictionary that is used to render page 2. The format continues in this fashion (ellipsis 1350) until all pages are accounted for. Additional dictionary blocks can be included in the format whenever a new set of repeating shapes is needed to render subsequent pages of the document image.

Tokenized Representation Extensions

The format of a tokenized representation can be extended to accommodate information not readily subject to tokenization. For example, if a source structured representation of a document contains black-and-white text together with a color photograph, the image of the color photo can be compressed using JPEG or other compression techniques and the black-and-white text image can be compressed using DigiPaper or other tokenizing compression according to the invention. The JPEG compressed photo, or a pointer to it, can be stored in an extension section of the position block for that page, if the tokenized format supports such extensions. In particular, position block extensions can carry position-dependent information, and dictionary block extensions can carry information that is to reused in more than one place in the document.

Extensions can be used, for example, to support tokenized compression of hypertext documents, such as World Wide Web pages. As is well known, a Web page can contain hypertext links to other Web pages. If an HTML document intended as a Web page is compressed into a tokenized representation according to the invention, its displayable text and bitmapped graphics can be tokenized and its link information (i.e., universal resource locator, or URL, information) stored in extensions. If the same link is used more than once in the document, its URL can be stored in a dictionary extension, and the page positions which are considered active and which designate that link can be stored in position extensions. If the link occurs only once, both the URL and the page position can be stored as a position extension.

Extensions can also be used to support tokenized compression of objects containing embedded objects, such as Microsoft OLE objects (Microsoft Corp., Redmond, Wash.). An embedded object, such as an active spreadsheet embedded in an otherwise-textual document created with a word processing application program, can be represented by incorporating appropriate information (e.g., a pointer to the object) in the position block extension of the page of the rendered document on which that object is to appear. If the object is embedded at multiple points in the document, its corresponding information can be put into a dictionary extension.

Compression and Decompression Method Steps

Figure 14:
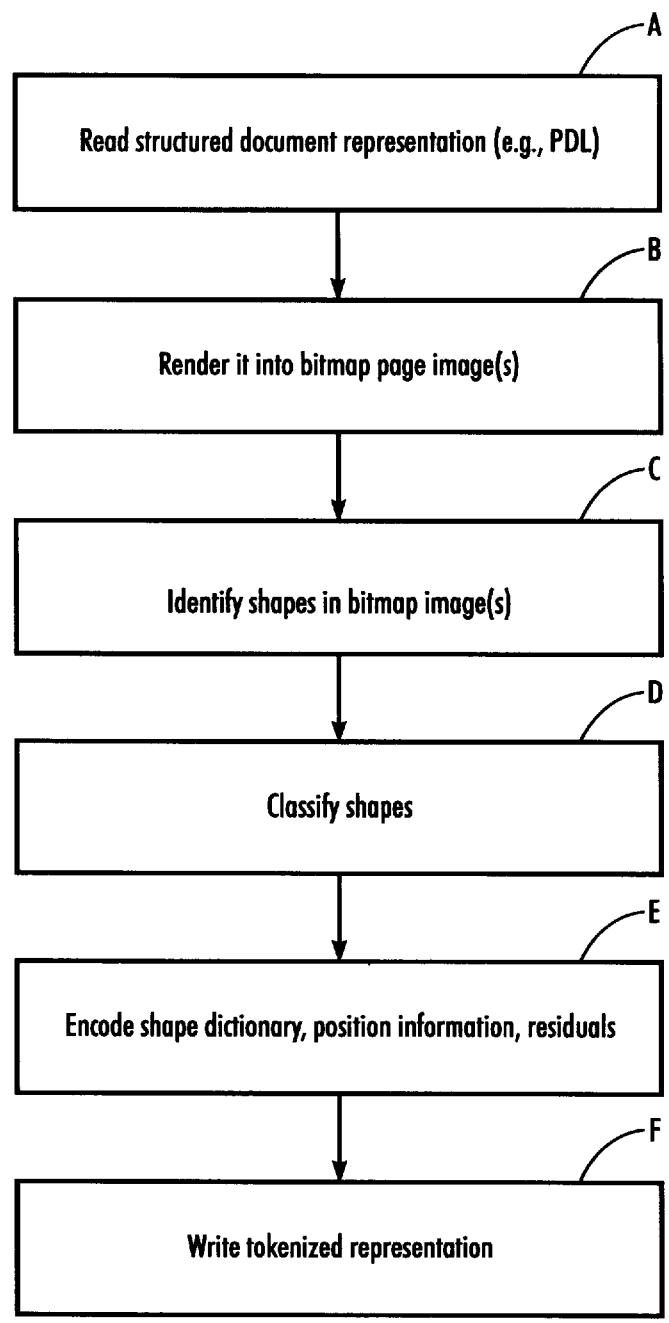
FIG. 14 is a flowchart of the steps in document compression.
Figure 15:
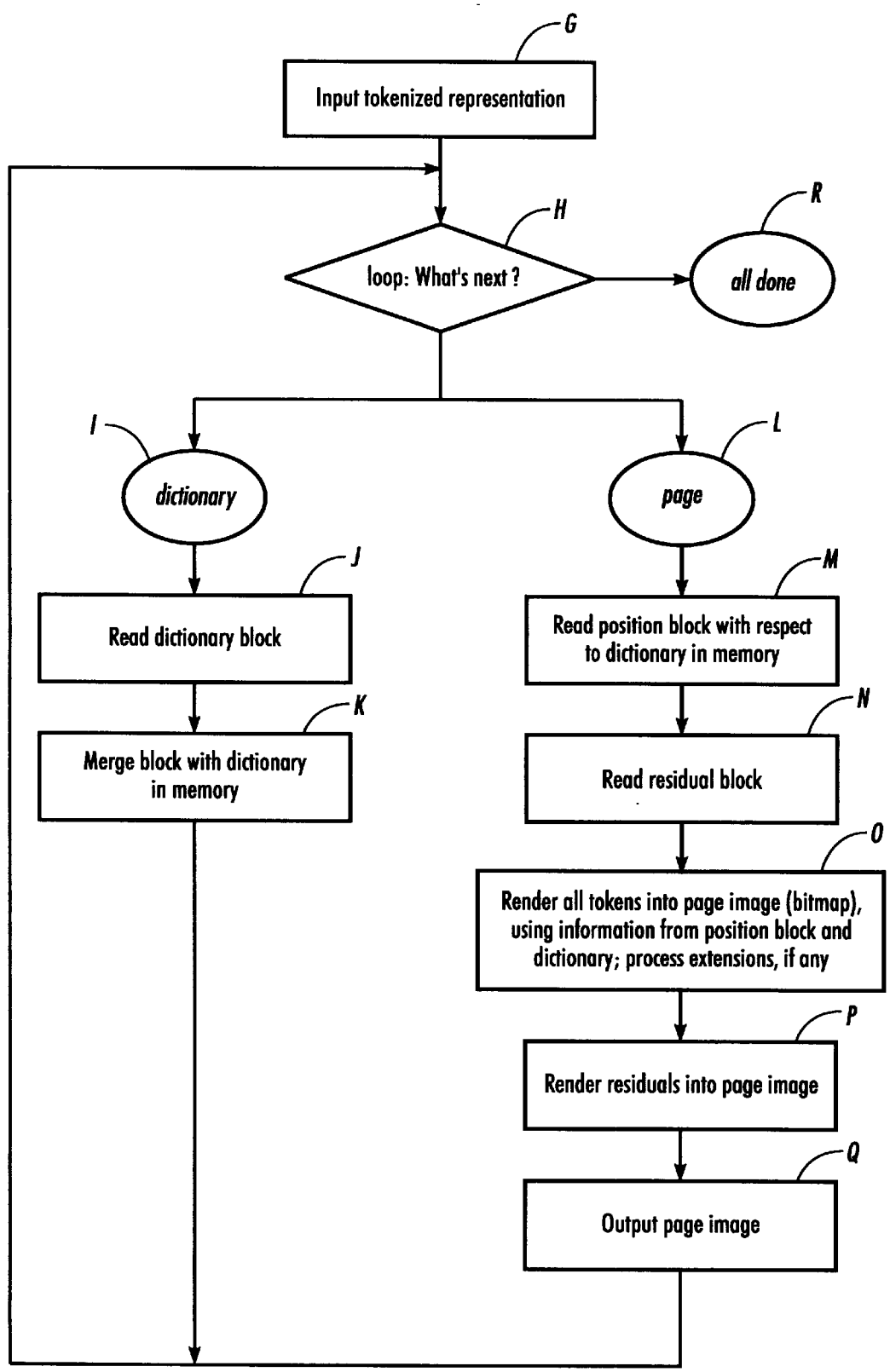
FIG. 15 is a flowchart of the steps in document decompression.

The flowcharts of FIGS. 14 and 15 illustrate, respectively, how the compression and decompression software works in the specific embodiment.

FIG. 14 shows a sequence of steps for compiling a structured document representation into a tokenized representation. A structured document representation, such as a PDL file, is read into working memory (step A) and is rendered into a set of bitmap images, one per page (step B) by a conventional PDL decomposer. Thereafter, tokenizing compression is performed (steps C, D, and E) by the compressor. First, the bitmap images are analyzed to identify the shapes therein (step C). Next, these shapes are classified, so that multiple occurrences of the same shape can be assigned to the same token (step D). Thereafter, the token dictionary, position information, and residuals are encoded (step E), together with any extensions, such as hypertext links or embedded nonbinary image components. This completes the construction of the tokenized compressed representation, which is then output (step F).

The step of identifying shapes (step C) is performed in the specific embodiment using a connected components analysis, although any other suitable technique can be used. The step of classifying shapes (step D) is performed in the specific embodiment using a very simple, lossless classifier: Two shapes are considered to match one another if and only if they are bitwise identical. This simple classifier contrasts favorably with the cumbersome classifiers used in the tokenization of scanned documents in the prior art, and points to an advantage of the invention: According to the invention, the document image that is being tokenized is an image generated directly from a PDL or other structured document description. Such images are inherently free from noise, losses, distortions, scanning artifacts, and the like.

Thus, there is no need to use approximate or heuristic classifiers as is done in known methods for tokenizing scanned documents. Instead, exact classification can be used, and time-consuming and error-prone heuristic comparisons can be eliminated. In particular, the exact classifier does not mistakenly confuse two characters, such as the number "1" and the letter "1", whose shapes closely resemble one another.

The PDL decomposer used in step B can be, for example, decomposer 45 from FIG. 5. The compressor used in steps C through E can be, for example, compressor 47 from FIG. 5. (A direct compiler, per arrow 49 of FIG. 5, goes directly from step A to step E.)

FIG. 15 shows the steps for rendering a tokenized representation into an output image. A tokenized representation, such as a DigiPaper file, is read into working memory (step G). Thereafter, a loop begins (step H) as the decompressor reads through the blocks of the file. If the next block is a dictionary block (step I), the dictionary block is read (step J) and its tokens added to any tokens already in the dictionary stored in working memory (step K). Alternatively, if the next block is a page header (step L), that page is decompressed and rendered (steps M through Q): The position block for the page is read (step M); it will be interpreted with respect to the set of tokens of the dictionary currently stored in working memory. The residual block is also read (step N). The tokenized symbols are then converted into a bitmap image of the page (step O), using the information from the position block for the page and the tokens in the currently stored dictionary. The individual bitmaps for the tokens are transferred (for example, using a bit-blt operation) into the larger bitmap that is being constructed for the page. Also, any extensions are processed at this time. Next, residuals are rendered, their bitmaps being transferred into the larger bitmap as well (step P). The completed page image is output (step Q) to a display screen, IOT, persistent storage, network, fax, or other output mechanism. The loop continues (step H) until the entire tokenized representation (or any desired portion thereof) has been processed (step R).

Details of the DigiPaper Tokenized Representation

The next several sections, numbered 1 through 8 for convenience, present in detail a format for tokenized representation of documents that is used in a preferred embodiment of the invention. The format, described with reference to FIGS. 16–23, is called the DigiPaper format, and (needless to say) is to be preferred over the simplified tokenized representations discussed previously with respect to FIGS. 11–13.

Section 1 discusses design criteria that influenced the design of the DigiPaper format. Section 2 gives an overview of the components of a compressed data stream in this format, without making any reference to the higher-level structures of the data stream. Sections 3 through 5 give more detailed descriptions of each of those components. Section 6 describes the algorithm used to build a Huffman tree. Section 7 gives a description of a higher-level data stream that encapsulates the components. Section 8 discusses some additional aspects of this data stream format.

The text of Sections 1 through 8 includes references to Tables 1 through 12. These tables can be found at the end of the Detailed Description.

1. Introduction

Criteria that influenced the design of this coding format include:

It should be possible to encode multiple pages in a single stream, as the compression achieved for multiple-page documents is considerably better than the compression achieved for single-page documents.

If a document, encoded in this format, is stored in a file, then it should be possible to recreate any given page without having to parse fully all the preceding pages.

The coding of individual values within the format should be as simple as possible, consistent with the goal of good compression; this allows implementation in low-cost devices.

2. Data stream components

A data stream encodes a document, which consists of a number of pages. The data stream comprises some number of dictionary blocks, position blocks, and residual blocks. All bytes are filled from MSB to LSB. Unless specified otherwise, all 32 bit values are unsigned and are encoded using Table 1.

2.1. Dictionary blocks

A dictionary block contains information about a number of tokens. Each token's bitmap (and associated size and width) are stored in the dictionary block. Some other information about each token is also stored in the dictionary block. Specifically, the number of uses of each token (its use count) is encoded along with the token. This allows the decoder to build a Huffman tree giving the encoding of each token number.

Dictionary blocks can be arbitrarily interleaved between pages, except that there must be at least one dictionary block before the first position block.

2.2. Position blocks

A position block contains a number of triples, each comprising an X coordinate, a Y coordinate, and a token number. The tokens referenced in any given position block must be defined in some dictionary block that precedes (in the data stream) the position block.

Each position block is interpreted relative to the union of all previous dictionary blocks: it can contain any token from any of those blocks (but see Subsection 3.3). The decoder therefore must consider all the tokens in all those dictionary blocks, and build a Huffman tree based on the use counts associated with each token in order to decode the token numbers encoded in the position block. Details on building this Huffman tree are given in Section 6.

There can be at most one position block per page.

2.3. Residual blocks

A residual block encodes a bitmap that contains all the non-token portions of a page. It can be decoded without reference to any block of any type.

There can be at most one residual block per page.

3. Dictionary block encoding

A dictionary block contains a set of tokens to be used (together with the tokens from previous dictionary blocks) to decode subsequent position blocks.

Figure 16:
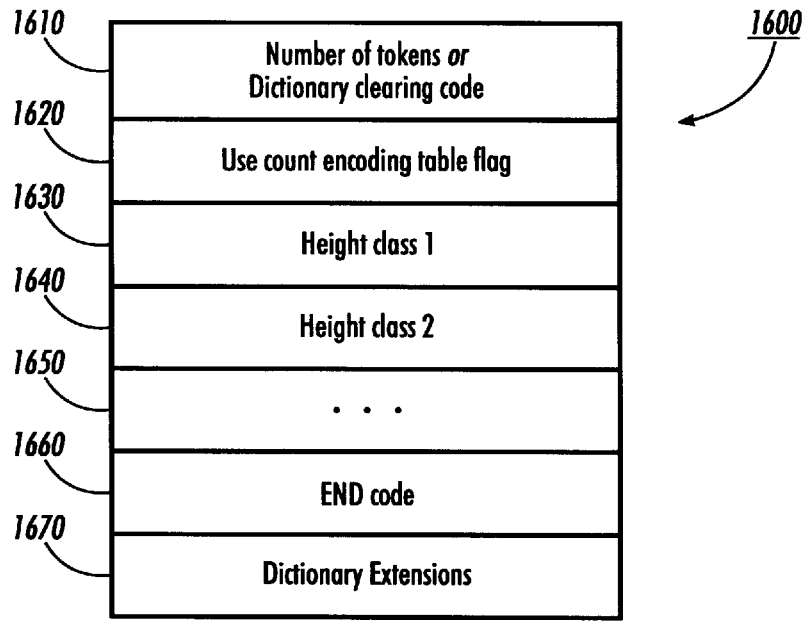

The format of a dictionary block is shown in FIG. 16. Dictionary block 1600 contains a first value 1610, to be described shortly, that is either a token count or a dictionary clearing code. This is followed by a flag 1620 indicating which use count encoding table is to be used for this dictionary block. Additionally, dictionary block 1600 contains height classes (see Section 3.1) such as, for example, height class 1 1630, height class 2 1640, and further height classes (as indicated by ellipsis 1650). Following the height classes are an END code 1660 and dictionary extension section 1670.

The first value 1610 in a dictionary block is a 32 bit (unsigned) value indicating the number of tokens stored in that block. This value, the token count, is itself stored using the encoding from Table 1. If the number of tokens is specified as being zero, then the first value 1610 is a dictionary clearing code (as a dictionary block containing zero new tokens is not useful); see Subsection 3.3 for details on dictionary clearing codes.

Following the token count 1610 is a 1-bit flag 1620 indicating which use count encoding table is used for this dictionary block: If the bit is 0, Table 3 is used to encode token use counts; if the bit is 1, Table 4 is used.

3.1. Height classes

All the tokens stored in the dictionary block are sorted by their heights and widths, and grouped into height classes: groups of tokens having the same height. All tokens of a certain height are in the same height class. Within the height class, they are sorted by increasing width.

Figure 17:
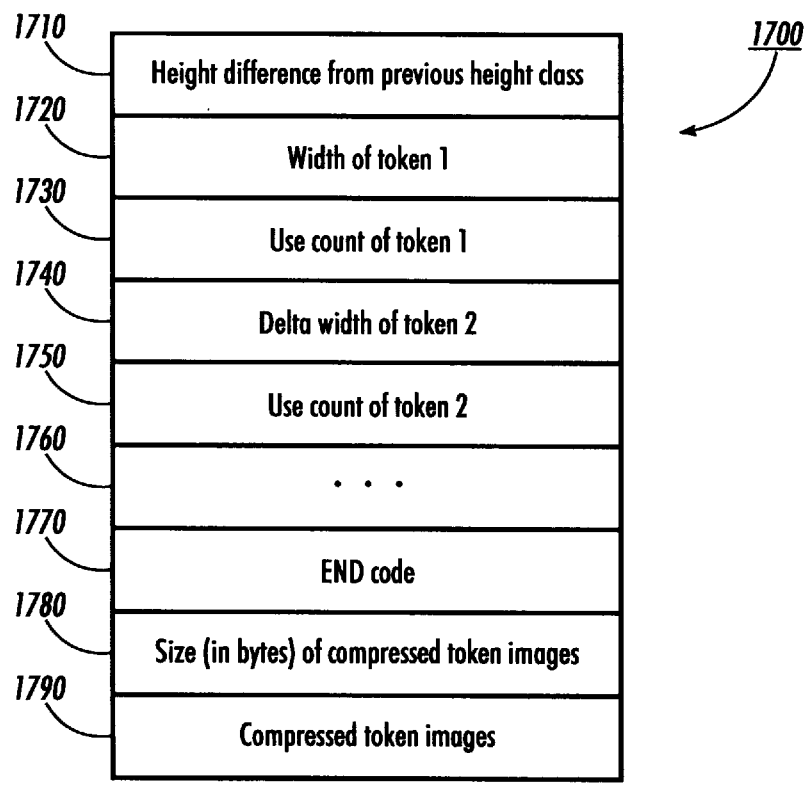

The format of a height class is shown in FIG. 17. Height class 1700 contains a first code 1710, a first token's width 1720, a use count 1730 of token 1, a delta width 1740 of token 2, a use count 1750 of token 2, additional delta widths and use counts for additional tokens (as indicated by ellipsis 1760), an END code 1770, a size 1780 (in bytes) of the compressed token image, and the compressed token images 1790 themselves.

3.1.1. Encoding of token heights

The first code 1710 in the height class is the difference in height from the previous height class. Classes appear from the smallest (shortest) on up, so these deltas are always positive. The deltas are encoded according to Table 2, except that since each height class's height differs by at least one from the previous class's height, the height delta is decremented by one before being encoded. There is an imaginary height class of height zero preceding the first real height class, so the first class's height is encoded directly. The last height class is followed by an END code from Table 2 instead of a valid height delta code.

3.1.2. Encoding of token widths

Within each height class, the tokens are sorted by increasing width. The width of each token is represented as a difference from the previous token's width; this is always nonnegative. The first token's width 1720 is encoded directly (i.e., as a delta from an imaginary token of width zero). The widths are encoded using Table 2. Note that the encoding for a width delta $\omega$ is exactly the same as the encoding of $\omega+1$ as a height delta. The last token in each height class is followed by an END code from Table 2.

3.1.3. Encoding of use counts

Each token has an associated use count. This is, in concept, the number of times that this token occurs in all the position blocks between this dictionary block and the next dictionary block. In some cases, it may not be exactly this value (i.e., the decoder should not count on the token occurring exactly that many times in those position blocks). These use counts should only be used to build the Huffman coding of token numbers (see Section 4).

Some tokens are single-use tokens. This means that the compressor guarantees that this token is used exactly once, and so the decompressor may be able to free up memory once it has used the token. Typically, such tokens are large, so the memory savings that this can afford the decompressor is significant. For single-use tokens, the use count is really one, but is encoded as zero to distinguish it from other tokens which happen to be used only once between this dictionary block and the next (singletons), but which theoretically could be re-used later. Single-use tokens should not be completely forgotten once they are used (they must be considered when building Huffman trees, even if they can no longer occur), but the only information that needs to be retained is the size of the token and its position within its dictionary block (needed to break ties when computing the token's Huffman code); its image information can be discarded.

This might seem like a waste-once the single-use token has occurred in some position block, then it cannot reoccur, and so its portion of the token number code space is wasted. However, suppose that the decompressor skips the position block where the token's use occurs. This might happen, for example, because someone was interactively browsing a file stored in this format, and they skipped over the page where the single-use token was used. The decompressor would then have no way of knowing, short of completely parsing that skipped page's position block, that the single-use token had been used; this extra parsing (possibly of many skipped pages) is detrimental to interactive use; it introduces an unneeded dependence between the parts of the file.

In some applications, singletons and single-use tokens might not be stored in the token dictionary; they might be encoded in the residual block of the page where generally (this generally yields better compression and reduced decoder memory requirements). If they are present in this dictionary block, Table 3 should be used to encode use counts; if they are not present, Table 4 should be used. The use count encoding flag bit (in the dictionary block header) indicates which table was used. Note that Table 4 cannot encode use counts of 0 or 1.

3.1.4. Encoding of token images

All the token images within a height class are concatenated left-to-right in the same order (i.e., sorted by increasing width), with the first (smallest) being placed leftmost. This single image is then CCITT Group-4 compressed. The Group-4 compression uses no EOL codes, and fills bytes MSB-to-LSB.

The length (in whole bytes) of the encoding is written out as a 32 bit value using Table 1. The compressed image is then written out, beginning at the next byte boundary in the file. The next height class begins on the byte boundary following the compressed image; thus, the Group-4 compressed image of the height class begins and ends on a byte boundary.

In some cases, Group-4 compressing the image of the height class increases its size. When this happens, the encoder may store the image bitmap uncompressed. It indicates this by saying that the length of the stored bitmap is zero bytes. This is an impossible byte count for the results of compression, as no height class is empty, so the decoder can recognize this situation. The size of the height class bitmap is known to the decoder at this point, so it knows the number of bytes it actually occupies. Each row of the bitmap is padded to end on a byte boundary.

3.2. Dictionary block extensions

After the last height class, the dictionary block may contain extensions. At the moment, this section of the dictionary block is largely undefined. It is expected that it will be used to store extra information about the tokens in the dictionary block; for example, what ASCII characters they represent, if this has been determined.

The only part of the extension section that is defined in this embodiment is the length field. Immediately following the last height class is a 32 bit value (stored using the encoding in Table 1) giving the size, in bytes, of the dictionary block extension section. The extension section itself, if any, begins on the next byte boundary. If there are no extensions, a length of 0 should be given.

3.3. Dictionary clearing codes

If the value of the number of tokens field in a dictionary block is zero, then this indicates that this dictionary block is preceded by a dictionary clearing code. Such clearing codes reduce storage requirements in the decompressor, as well as improve the storage efficiency by reducing the number of tokens in the Huffman tree, and thus the number of bits required to encode token numbers in subsequent position blocks. They indicate that the token dictionary stored in the decompressor should be cleared. However, some tokens from previous dictionary blocks (the ones the compressor thinks most likely to be useful in the future) may be retained.

Figure 18:
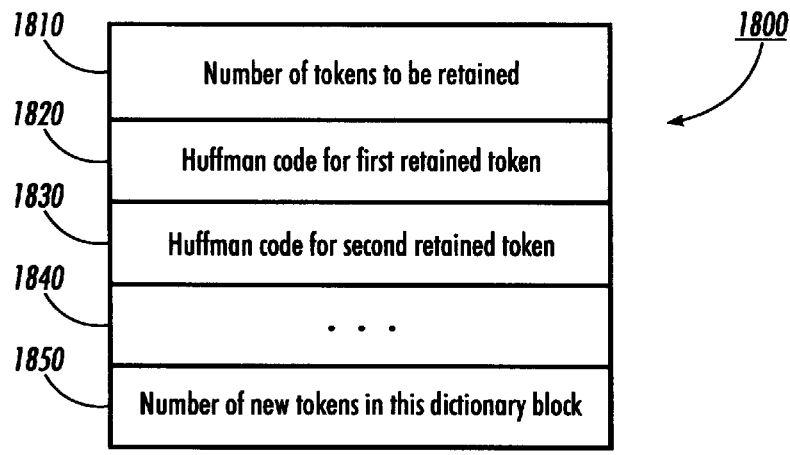

The format of this clearing section is shown in FIG. 18. Dictionary clearing section 1800 contains a value 1810 indicating the number of tokens to be retained 1810, followed by the Huffman codes for the retained tokens (e.g., code 1820 for the first retained token, code 1830 for the second, etc., additional codes being represented here by ellipsis 1840). Following the Huffman codes is a value 1850 indicating the number of new tokens in this dictionary block.

The clearing section occurs immediately after the "zero tokens in this dictionary block" flag that indicates its presence. The number of tokens to be retained 1810 is encoded using Table 1. The final value in the section is the number of new tokens in this dictionary block; the dictionary block then proceeds as usual. Note that the Huffman tree must be built, as it would have been for a position block at this location in the file.

4. Position blocks

Position blocks encode binary images by storing a sequence of (token position, token number) pairs. A position block does not contain the size of the image rectangle that it represents; this is left to some other layer of the file format.

The tokens used within any position block can be drawn from any dictionary block which precedes it in the file (unless some preceding dictionary block contained a dictionary clearing code; see Subsection 3.3). The tokens are referred to by their Huffman codes.

These are computed by (logically) concatenating all previous dictionary blocks, and then building a Huffman tree of the use counts of the tokens in those blocks. Note that this tree must be rebuilt every time a new dictionary block is encountered in the file. The exact algorithm for building the Huffman tree is given in Section 6.

For the purposes of this discussion, it is assumed that the coordinates of the top left comer of the image rectangle encoded by this position block are (0,0). Since all the coordinates within the block are relative, the actual coordinates can be anything; everything is encoded relative to this top-left position. Coordinates increase down the image, and rightwards across the image. Usually, the Y coordinate represents the vertical position of an instance of a token, and the X coordinate represents its horizontal position. However, there is a transposed encoding mode, intended for documents where the primary direction of text flow is vertical (such as occurs in Chinese text). In this case, the X coordinate of a token position represents its vertical position in the image, and the Y coordinate represents its horizontal position.

The position that is encoded for a token is the position of its bottom left comer pixel in the normal encoding mode, and the position of its top left comer pixel in transposed encoding mode.

Figure 19:
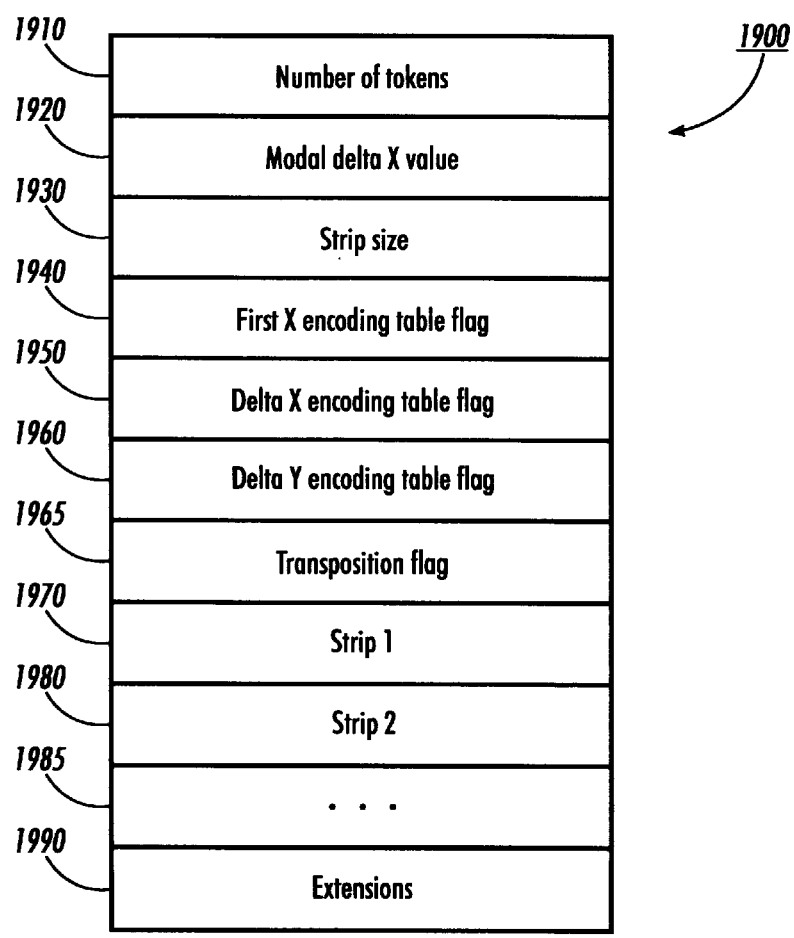

The format of a position block 1900 is shown in FIG. 19. The first value 1910 is the number of tokens present in this position block, encoded using Table 1. Following that is some information about the encoding used within this block. The fields here are:

Modal delta X value

This unsigned 4-bit field (field 1920) gives the modal delta X value. This value is subtracted off all delta X values before they are encoded, and must be added back upon decoding.

Strip height

This 2-bit field (field 1930) gives the height of the strips that the image is divided into. Three values are currently defined: 0, 1, and 3, indicating strip heights of 1, 2, and 4 pixels respectively.

First X encoding table flag

This 2-bit field (field 1940) indicates which encoding table was used to encode the first X position within each strip; see Tables 5 and 6. Values of 2 and 3 are currently undefined.

Delta X encoding table flag

This 2-bit field (field 1950) indicates which encoding table was used to encode the delta X values within each strip; see Tables 7, 8, and 9. A value of 3 is currently undefined.

Delta Y encoding table flag

This 2-bit field (field 1960) indicates which encoding table was used to encode the delta Y values between strips; see Tables 10, 11, and 12. A value of 3 is currently undefined.

Transposition flag

This 1-bit field (field 1965) contains 0 if the position block is encoded normally, and 1 if it is encoded transposed.

Following this initial encoding information, the locations and identifications of the tokens appearing in this image are encoded. The image is divided up into strips of the size encoded by the strip size field (1, 2 or 4 pixels). In the normal coordinate encoding mode, the strips divide the image into horizontal slices; in the transposed encoding mode, the strips divide the image into vertical slices. For clarity, strips will be described in the context of the normal encoding mode (in terms of rows).

In position block 1900, the strips include strip 1 1970, strip 2 1980, and additional strips (as indicated by ellipsis 1985). Following the strips is a position extension section 1990.

The first row of the first strip in a position block is the top row of the image. The strips are encoded top-to-bottom. Only strips containing invocations of some token are actually coded; each nonempty strip encodes the number of strips that were skipped between it and the previous non-empty strip. Within each strip, the tokens are sorted by increasing X position.

Figure 20:
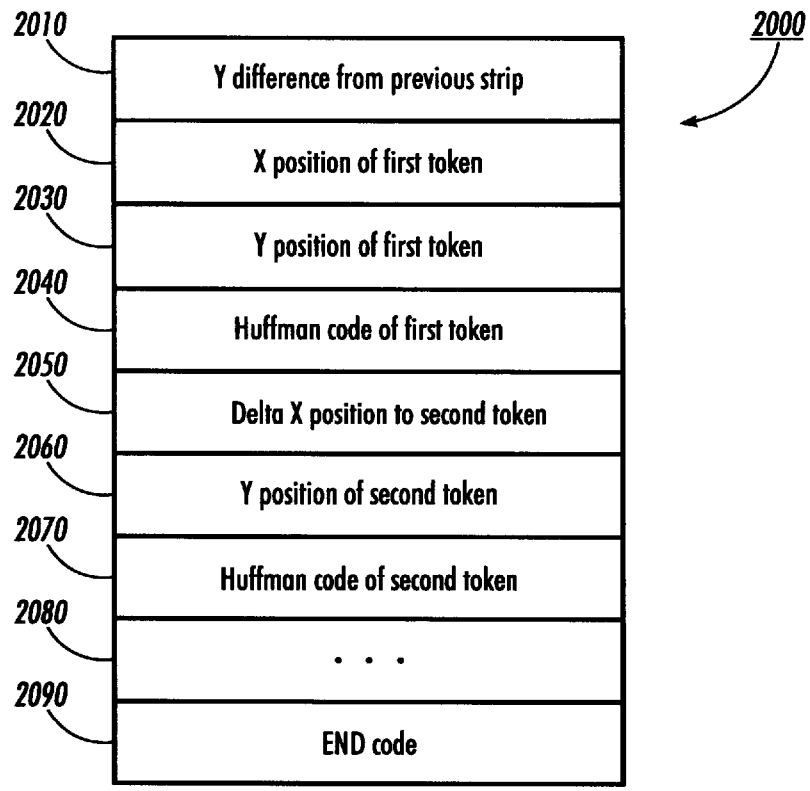

The format of a single strip is shown in FIG. 20. Strip 2000 contains the Y difference 2010 from the previous strip, the X position 2020 and Y position 2030 of the first token, the Huffman code 2040 of the first token, the delta X position 2050 to the second token, the Y position 2060 of the second token, the Huffman code 2070 of the second token, and additional delta-X, Y, and Huffman code information for additional tokens (as indicated by ellipsis 2080). At the end of strip 2000 is an END code 2090.

The first value in a strip (e.g., first value 2010 in strip 2000) is the difference between this strip's starting Y position and the previous strip's starting Y position. Since strips are constrained to begin on rows divisible by the strip height, the encoder divides the actual difference by the strip height then encodes it. The encoding is done using one of Tables 10 through 12; which table is used is indicated by the "Delta Y encoding table flag" in the position block's header. There is an imaginary nonempty strip just above the top of the image; this is used to compute the offset for the first strip's Y position.

The X position of the first token within each strip is encoded using Tables 5 or 6; which table is used is indicated by the "First X encoding table flag" in the position block's header. The X position is encoded as an offset from the first X position of the previous strip (or as an absolute value, in the case of the first strip).

The Y position of each token within a strip is encoded with 0, 1, or 2 bits, depending on the strip height (strip height of 1, 2 or 4). The value is the number of rows that this token's reference position (its lower left corner) is down from the top of the strip.

The X position of each token in the strip, except the first, is encoded (in the standard encoding mode) by taking the token's X position, and subtracting the X position of the previous token, plus the previous token's width; this computes the difference in X between this token's lower left corner and the pixel to the right of the previous token's lower right corner. In the transposed encoding mode, the X position of each token in the strip is encoded by taking the difference between the token's X position and the X position of the previous token, plus the previous token's height. Thus, in the transposed encoding mode, what is encoded is the vertical difference between this token's upper left corner and pixel below the previous token's lower left corner.

In either case, the modal delta X value given in the position block's header is subtracted from this value before it is encoded; this ensures that the most common value encoded is always zero. The encoding table used for the resulting signed value is given by the "Delta X encoding table flag" value; it is one of Tables 7 through 9.

The last token in a strip is flagged by an END code (drawn from the appropriate delta X encoding table) instead of a delta X code. Since strips are never empty, there is no way to encode an END code in any of the first X encoding tables.

Note that there is no end-of-image code; instead, the last strip is flagged by a Y position which is outside the possible range for this image rectangle. This position does not start a real strip, so there are no token positions following it. Instead, it is followed (see FIG. 19) by a position block extension section 1990, similar to the dictionary block extension 1670 (from FIG. 16). Currently, the only part of section 1990 that is defined is the length field: a 32 bit value (stored using the encoding in Table 1) giving the size, in bytes, of the position block extension section, which begins on the next byte boundary. A length of 0 is used to indicate an empty extension section.

5. Residual blocks

Each page's bitmap is encoded in two parts: the position block, giving the tokens from the dictionary used on this page, and the residual bitmap. The residual bitmap encodes all the marks on the page that were not encoded in the position block. On decoding, the tokens specified by the page's position block should first be written into the uncompressed bitmap; the residual block should then be combined with that bitmap via an OR operation. The bitmap stored in the residual block may be smaller than the original page bitmap. If the residual bitmap is empty (all white), then the residual bitmap fields (including the length field) all contain zero, and there is no encoded residual bitmap.

Figure 21:
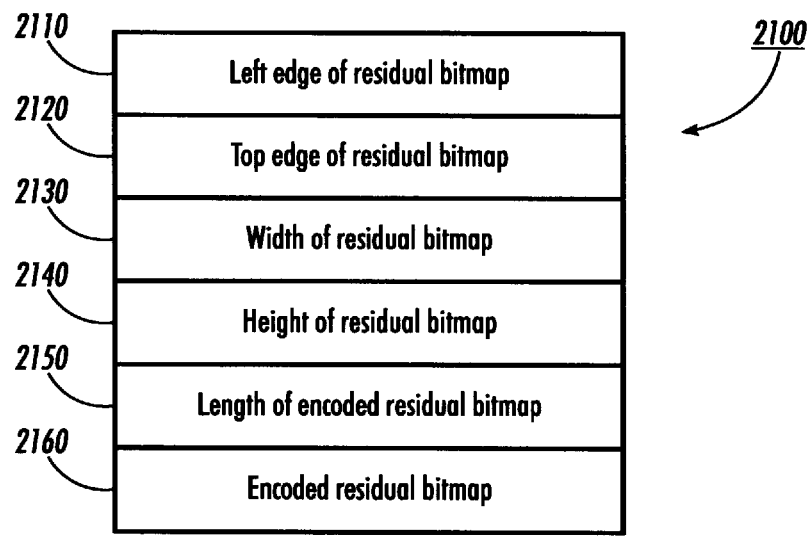

FIG. 21 shows the format of a residual block 2100. All the fields, except the actual encoded residual bitmap, are unsigned 16 or 32 bit values. They are encoded as 2 or 4 bytes respectively, with the most significant byte appearing first ("big-endian" encoding).

Left edge of residual bitmap

This field (field 2110) gives the position of the left edge of the residual bitmap relative to the original bitmap. It is a 2 byte value.

Top edge of residual bitmap

This is a 2 byte value (value 2120) giving the position of the residual bitmap's top edge relative to the original bitmap.

Width of residual bitmap

This is a 2 byte value (value 2130) giving the width of the residual bitmap.

Height of residual bitmap

This is a 2 byte value (value 2140) giving the height of the residual bitmap.

Length of encoded residual bitmap

This is a 4 byte value (value 2150) giving the length in bytes of the encoded residual bitmap.

Encoded residual bitmap

This is a CCITT Group-4 encoded representation 2160 of the residual bitmap. The Group-4 compression uses no EOL codes, and fills bytes MSB-to-LSB. As in the case of dictionary height classes, in Subsection 3.1.4, this bitmap may optionally be stored uncompressed; this is flagged by a byte-count value of zero.

6. Huffman encoding

The algorithm used to build the Huffman tree is:

Build an array of the token use counts. Tokens whose use counts are given as zero are considered to have a use count of one (these are single-use tokens). The order of the array should be the exact order in which the tokens occurred in the file up to this point. After a dictionary clearing code, the order of any retained tokens is the order in which they appeared in the list of retained tokens.

Scan the current array for the two lowest-value elements. In cases of ties, always choose the element closest to the start of the array. This can be done using a priority queue with a primary key of the use count, and a secondary key of the position in the array.

Create a tree node representing the merger of these two elements. Its use count is the sum of their use counts.

In the array, replace the first of these two elements (the one closest to the start of the array) with this merged node. Remove the second element from the array (but don't forget it).

Continue until the array contains only a single node.

Use this tree to find the length of the Huffman code for each token: traverse the tree down to each token; the length of this path is the number of bits in the code for that token.

Assign the codes themselves using the "canonical Huffman code" assignment algorithm:

Let c[l] be the number of codes of length l bits.

Assume that the maximum possible code length is 32.

$f[32]=0; \text{for}(l=31; l>=0;l--)f[l]=(f[l+1]+c[l+1])/2;$ f[l] is now the first (lowest) value for the all the codes having length l bits. These should be assigned in increasing order, in the order that the tokens occur in the file: the first token whose code is of length l gets assigned the code f[l], the next of length l gets the code f[l]+1, etc.

7. Encapsulating the blocks

Figure 22:
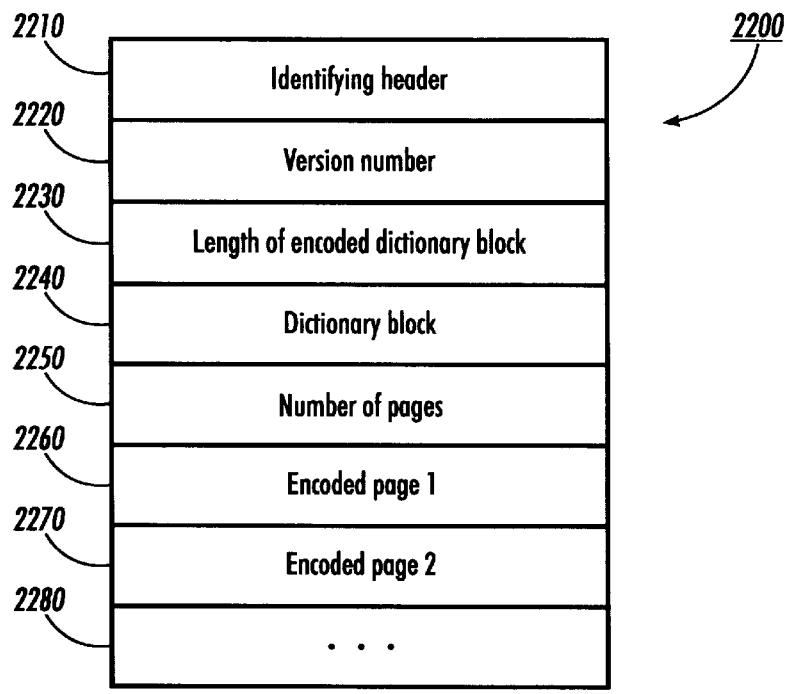

The current encapsulation of these blocks is quite simple; other more complex encapsulations are possible. The one described here is minimal, but is quite easy to parse, and allows random access to pages without undue difficulty. The fields in this encapsulation are shown in FIG. 22.

Identifying header

This is a 5-byte field (field 2210) containing the bytes 0x54 0x03 0x6f 0x8d 0x50.

File version

This is a 1-byte field (field 2220) containing the version of the encapsulation used. Currently this value is 9.

Length of encoded dictionary block

This is a 4-byte value (value 2230) giving the length in bytes of the dictionary block. The value is stored in network byte order (MSB first), as are all the other numerical values in the higher-level encapsulation.

Dictionary block

This is a dictionary block (dictionary block 2240), in the format described in Section 3. Currently, there is only one dictionary block, and dictionary clearing codes are not used; modifying the encapsulation to support these is not difficult.

Number of pages

This is a 2-byte value (value 2250) giving the number of pages in this file.

Pages

Figure 23:
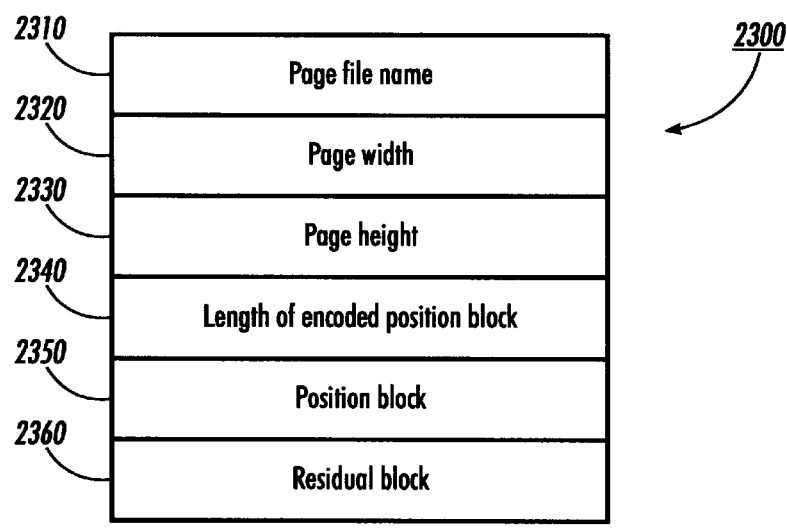

Each of these (e.g., encoded page 1 2260; encoded page 2 2270; additional encoded pages as indicated by ellipsis 2280) is encoded as shown in FIG. 23. The fields of page 2300 are:

Page file name

This is a NUL-terminated string (string 2310) giving the name of the file that this page originally came from, or other identifying information.

Page width

This is a 2-byte value (value 2320) giving the width of this page's bitmap.

Page height

This is a 2-byte value (value 2330) giving the height of this page's bitmap.

Length of encoded position block

This is a 4-byte value (value 2340) giving the length in bytes of the page's position block.

Position block

This is a position block 2350, in the format described in Section 4.

Residual block

This is a residual block 2360, in the format described in Section 5.

It is not necessary to encode the length of the residual block, as it can easily be determined by scanning the first few bytes.

7.1. Embedding within TIFF

TIFF is currently commonly used to store CCITT Group-4 compressed bitmaps. This subsection briefly describes how dictionary blocks, position blocks, and residual blocks could be embedded within TIFF files, to allow TIFF to represent token-compressed bitmaps.

Since the decompressor needs to have seen all the dictionary blocks preceding a position block in order to get the decompression right, these dictionary blocks should be as easy to find as possible. Preferably, there is at most one block per page, stored (as a tag) in the top-level directory for that page. As the decompressor walks through the file to get to a particular page, it therefore has to pass by all the dictionary blocks it will need. It doesn't need to parse them until it actually runs into a token-compressed binary image, but just remember their positions (and order).

The position blocks, on the other hand, should re-use as much as possible of the information available for binary images. They should be stored as regular binary images, but using a variant compression method (the TIFF spec allows compressed images to be tagged by the compression method used).

The residual blocks could also be stored as binary images, in the same pages as the corresponding position blocks; storing multiple images for the same page is allowed by the TIFF spec (but it does not adequately specify how they should be combined).

8. Further Discussion

Here are some additional issues related to the current DigiPaper format and to possible variations of the format.

In the current format, a position block represents an entire page. In some applications (notably a fax output device), pages might be broken down into slices; this means that the page can start being printed as quickly as possible, once the first page slice is decoded. Each page slice would comprise a position block and a residual block.

The top-level format would have to change slightly to accommodate this: dictionary blocks would occur within a page (between page slices). This conflicts with the goal of allowing easy access to a single page: the decoder must read through the page and pick up those dictionary blocks in order to be able to decode some subsequent page. However, it still does not need to completely decode each page slice position block.

Any given document can have a large number of representations, depending on how the coder classifies the tokens on each page, where it places dictionary blocks and dictionary clearing codes, its choice of encoding tables, how pages are broken down into page strips, and so on. Memory requirements in the encoder and decoder can restrict the representations that can be successfully generated or decoded. When the encoder and decoder are conversing directly (as in a transmission to a fax output device), they can negotiate a memory limit, and the encoder can ensure that the decoder will not exceed this limit, by breaking each page down into small enough strips (to reduce the page image buffer memory requirements), and by inserting dictionary clearing codes (to reduce the token dictionary memory requirements). Such restrictions are likely to degrade compression.

When the document is compressed into a file, such a negotiation is not possible, and so decoders reading from such stored files must be prepared to use a (potentially) large amount of memory. However, in such a situation, the decoder is likely to be running on some powerful general-purpose computer, so this requirement is not too onerous. For fax machines, on the other hand, cost requirements can lead to situations where memory use is severely restricted; fortunately, these are exactly the situations where negotiation is possible.

The encoded token height classes and residual bitmaps are compressed using CCITT Group-4 compression, or are stored uncompressed in the cases where Group-4 actually increases their size. This was chosen because systems (both hardware and software) to perform Group-4 compression and decompression are common and quite simple. These bitmaps could be stored with any suitable lossless binary compressor; JBIG would be one choice.

Applications of the Invention

The DigiPaper file format has now been fully described. Next, some further applications of the invention will be discussed. High-speed printing was mentioned earlier as one application. The exemplary rendering components 200 that were illustrated in FIG. 10 suggest other applications, including prepress viewing, desktop publishing, document management systems, and distributed printing applications, as well as fax communications. In general, the invention can find application in any situation where quick, high-quality document rendering is needed.

The invention is particularly appropriate for interactive documents, such as World Wide Web documents. Because of the expressiveness of the tokenized representation (especially as compared with HTML), Web documents encoded in DigiPaper format can be rendered with fidelity comparable to print media. Moreover, rendering speeds of under 1 second per page for text and graphics are achievable. This means fewer unwanted delays for users downloading documents from remote Web servers.

Figure 24:
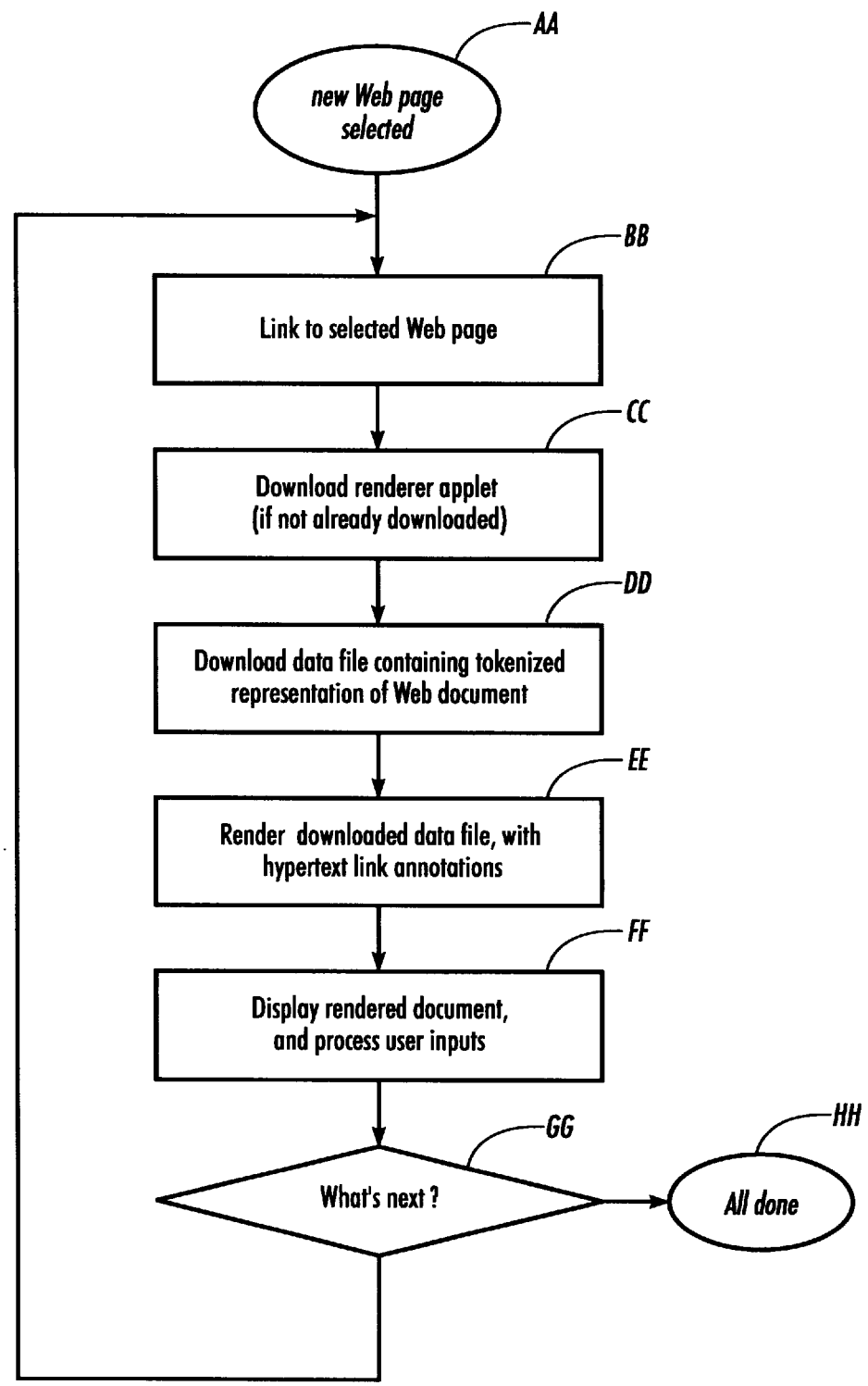
FIG. 24 is a flowchart showing the operation of a World Wide Web viewer incorporating Web pages that have been compressed as tokenized files.

The flowchart of FIG. 24 illustrates a simple interaction between a Web server and a client computer running a Web client (browser) program, such as Netscape Navigator (Netscape Communications, Inc., Mountain View, Calif.), that supports the Java programming language (available from Sun Microsystems, Inc.). The client computer receives a command indicating that the client computer's user has selected a hypertext link pointing to a new Web page (step AA) encoded in DigiPaper format. The computer responds by following the selected link (step BB), and beginning to download the selected page. The first thing to be downloaded is a Java-language program, or applet (step CC), which the client computer automatically begins to execute. By executing the Java applet, the client computer is caused to download a data file containing a DigiPaper tokenized representation of the displayable text and graphics that make up the readable content of the Web page (step DD). The applet also includes DigiPaper decompressor software, so that once the tokenized representation has been downloaded, the client computer can render it (step EE) and display the resulting Web page (step FF). The DigiPaper representation can include extensions to support the hypertext links embedded in the downloaded Web page, and the applet can recognize the user's selection of new links on the decompressed page (continuing in step FF). Depending on what the user decides to do next (step GG), the applet can either link to a new page (step BB) in response to the user's selection of a link on the downloaded DigiPaper page, or can return control to the browser (step HH). If a new Web page is selected, the applet remains in control; in particular, if the newly selected page is a DigiPaper page, the applet need not be downloaded again (step BB). If the user has, for example, selected a browser function not immediately related to the contents of the currently displayed page, the applet can terminate or suspend, and control can return to the main browser program (step HH).

This example shows that where a DigiPaper tokenized document representation is bundled with a decompressor applet, the resulting package is, in effect, a self-rendering file format.

So long as the browser supports the industry-standard Java language, the browser need not be specifically enabled for DigiPaper. The applet takes care of that.

Variations and Alternative Embodiments

Many alternative embodiments of the invention are possible. Here are a few examples:

The structured representation of the source document need not be a PDL representation. Other possibilities include document exchange formats (e.g., PDF, Common Ground) and PCL5. In general, any non-image-based structured document representation can be used.

Although the DigiPaper file format is the preferred format for the tokenized representation, other structured document representations can be used. One possibility is to use a highly reduced subset of a PDL. The subset need include only a few operators, just enough to denote what the bitmaps are for the various symbols and where the symbols are to be positioned within the rendered image, along with basic commands to cause the symbols to be drawn at the desired positions. For example, in PostScript, the subset can be the operators Imagemask, moveto, rmoveto, definefont, and show; these operators are defined in the PostScript Manual at pages 435, 456, 483, 398, and 520, respectively. In particular, the definefont operator can accept bitmapped fonts, and thus can be used to define the token bitmaps.

Although the image-based DigiPaper tokenized representation is resolution-dependent, it is nevertheless possible to convert it to print or display at a resolution other than the one at which it was tokenized. This can be done, for example, by downsampling. The resulting images can be of acceptable quality for many applications.

The residual image for a page can be considered as just another token, although it is stored outside the dictionary block for efficiency. Alternatively, the residual image can be stored in the dictionary block, as a token or set of tokens.

The inventive compression technique can be incorporated in a document compression system that supports both lossy encoding of scanned pages, and lossless encoding of rendered pages. Specifically, the inventive technique is used to provide lossless symbol-based representation of rendered text/graphics. Symbol-based techniques of the prior art can be used to encode scanned document pages containing text and graphics; preferably, the same file format (e.g., DigiPaper) is used for both the lossy and the lossless technique, so that the same rendering engine can be used regardless of the source of the document image. Another technique, such as JPEG or other lossy encoding technique, can be used for color and gray bitmap images (e.g., photographs).

Conclusion

A new, computationally efficient method of compiling a page description language into a tokenized, fontless structured representation and of quickly rendering this fontless representation to produce a document image has been described. A compressor or tokenizer takes a set of page images, formed directly from a PDL file or other structured representation of a document, and converts these page images into a tokenized representation based on tokens and positions. A decompressor reconstructs the page images from the stored tokens and positions, building up an overall bitmap image for each page from the component subimages of tokens whose shapes occur on that page. The tokenized, fontless structured representation employed by the inventive method provides a degree of expressiveness equal or comparable to what has previously been available only with PDLs. Yet this representation is highly compact and can be rendered very quickly and predictably, and can conveniently be bundled with decompression software to provide self-extracting, self-displaying documents. The inventive method can be embodied in hardware configurations that include both general-purpose computers and special-purpose printing and imaging devices.

The foregoing description illustrates just some of the uses and embodiments of the invention, and many others are possible. Accordingly, the scope of the invention is not limited by the description, but instead is given by the appended claims and their full range of equivalents.

TABLE 1

Encoding for 32-bit values.

| Value | Encoding |
| --- | --- |
| 0...127 | 0 + value encoded as 7 bits |
| 128...1151 | 10 + (value − 128) encoded as 10 bits |
| 1152...32767 | 11 + value encoded as 15 bits |
| 32768...∞ | 1100000 + value encoded as 32 bits |

TABLE 2

Width/height encoding table

| Value | Encoding |
|---|---|
| 0 | 0 |
| 1 | 10 |
| 2 | 110 |
| 3...9 | 1110 + (value − 3) encoded as 3 bits |
| 10...∞ | 1111 + (value − 10) encoded as in Table 1 |
| END | 1110111 |

TABLE 3

Use count encoding table 0

| Value | Encoding |
|---|---|
| 0 | 100 |
| 1 | 0 |
| 2 | 101 |
| 3...34 | 110 + (value − 3) encoded as 5 bits |
| 35...∞ | 111 + (value − 35) encoded as in Table 1 |

TABLE 4

Use count encoding table 1

| Value | Encoding |
|---|---|
| 2 | 0 |
| 3 | 100 |
| 4 | 1010 |
| 5...6 | 1011 + (value − 5) encoded as 1 bit |
| 7...10 | 1100 + (value − 7) encoded as 2 bits |
| 11...14 | 11110 + (value − 11) encoded as 2 bits |
| 15...30 | 1101 + (value − 15) encoded as 4 bits |
| 31...94 | 1110 + (value − 31) encoded as 6 bits |
| 95...∞ | 11111 + (value − 95) encoded as in Table 1 |

TABLE 5

First X encoding table 0

| Value | Encoding |
|---|---|
| −∞...−2048 | 1110111110 + (−2048 − value) encoded as in Table 1 |
| −2047...−1024 | 1010 + (value + 2047) encoded as 10 bits |
| −1023...−512 | 1011 + (value + 1023) encoded as 9 bits |
| −511...−256 | 1100 + (value + 511) encoded as 8 bits |
| −255...−128 | 1101 + (value + 255) encoded as 7 bits |
| −127...−64 | 11110 + (value + 127) encoded as 6 bits |
| −63...−32 | 11111 + (value + 63) encoded as 5 bits |
| −31...−1 | 1110 + (value + 31) encoded as 5 bits |
| 0...127 | 00 + value encoded as 7 bits |
| 128...255 | 010 + (value − 128) encoded as 7 bits |
| 256...511 | 011 + (value − 256) encoded as 8 bits |
| 512...1023 | 1000 + (value − 512) encoded as 9 bits |
| 1024...2047 | 1001 + (value − 1024) encoded as 10 bits |
| 2048...∞ | 1110111111 + (value − 2048) encoded as in Table 1 |

TABLE 6

First X encoding table 1

| Value | Encoding |
|---|---|
| −∞...−1024 | 1011111110 + (−1024 − value) encoded as in Table 1 |
| −1023...−512 | 000 + (value + 1023) encoded as 9 bits |
| −511...−256 | 001 + (value + 511) encoded as 8 bits |
| −255...−128 | 1010 + (value + 255) encoded as 7 bits |

TABLE 6-continued

First X encoding table 1

| Value | Encoding |
|---|---|
| −127...−64 | 11100 + (value + 127) encoded as 6 bits |
| −63...−32 | 11101 + (value + 63) encoded as 5 bits |
| −31...−1 | 1011 + (value + 31) encoded as 5 bits |
| 0...31 | 1100 + value encoded as 5 bits |
| 32...63 | 11110 + (value − 32) encoded as 5 bits |
| 64...127 | 11111 + (value − 64) encoded as 6 bits |
| 128...255 | 1101 + (value − 128) encoded as 7 bits |
| 256...511 | 010 + (value − 256) encoded as 8 bits |
| 512...1023 | 011 + (value − 512) encoded as 9 bits |
| 1024...2047 | 100 + (value − 1024) encoded as 10 bits |
| 2048...∞ | 1011111111 + (value − 2048) encoded as in Table 1 |

TABLE 7

Delta X encoding table 0

| Value | Encoding |
|---|---|
| −∞...−15 | 11111001110 + (−15 − value) encoded as in Table 1 |
| −14...−8 | 1111100 + (value + 14) encoded as 3 bits |
| −7...−6 | 111111110 + (value + 7) encoded as 1 bit |
| −5...−4 | 11111110 + (value + 5) encoded as 1 bit |
| −3 | 111111111 |
| −2 | 1111101 |
| −1 | 1010 |
| 0...1 | 01 + value encoded as 1 bit |
| 2 | 11010 |
| 3 | 111010 |
| 4...19 | 100 + (value − 4) encoded as 4 bits |
| 20...21 | 111011 + (value − 20) encoded as 1 bit |
| 22...37 | 1011 + (value − 22) encoded as 4 bits |
| 38...69 | 1100 + (value − 38) encoded as 5 bits |
| 70...133 | 11011 + (value − 70) encoded as 6 bits |
| 134...261 | 11100 + (value − 134) encoded as 7 bits |
| 262...389 | 111100 + (value − 262) encoded as 7 bits |
| 390...645 | 1111110 + (value − 390) encoded as 8 bits |
| 646...1669 | 111101 + (value − 646) encoded as 10 bits |
| 1670...∞ | 11111001111 + (value − 1670) encoded as in Table 1 |
| END | 00 |

TABLE 8

Delta X encoding table 1

| Value | Encoding |
|---|---|
| −∞...−30 | 11111001110 + (−30 − value) encoded as in Table 1 |
| −29...−16 | 1111100 + (value + 29) encoded as 4 bits |
| −15...−12 | 111111110 + (value + 15) encoded as 2 bits |
| −11...−8 | 11111110 + (value + 11) encoded as 2 bits |
| −7...−6 | 111111111 + (value + 7) encoded as 1 bit |
| −5...−4 | 1111101 + (value + 5) encoded as 1 bit |
| −3...−2 | 1010 + (value + 3) encoded as 1 bit |
| −1...0 | 010 + (value + 1) encoded as 1 bit |
| 1...2 | 011 + (value − 1) encoded as 1 bit |
| 3...4 | 11010 + (value − 3) encoded as 1 bit |
| 5...6 | 111010 + (value − 5) encoded as 1 bit |
| 7...38 | 100 + (value − 7) encoded as 5 bits |
| 39...42 | 11011 + (value − 39) encoded as 2 bits |
| 43...74 | 1011 + (value − 43) encoded as 5 bits |
| 75...138 | 1100 + (value − 75) encoded as 6 bits |
| 139...266 | 11011 + (value − 139) encoded as 7 bits |
| 267...522 | 11100 + (value − 267) encoded as 8 bits |
| 523...778 | 111100 + (value − 523) encoded as 8 bits |
| 779...1290 | 1111110 + (value − 779) encoded as 9 bits |
| 1291...3338 | 111101 + (value − 1291) encoded as 11 bits |
| 3339...∞ | 11111001111 + (value − 3339) encoded as in Table 1 |
| END | 00 |

TABLE 9

Delta X encoding table 2

| Value | Encoding |
|---|---|
| −∞...−20 | 1101101110 + (−20 − value) encoded as in Table 1 |
| −19...−6 | 110110 + (value + 19) encoded as 4 bits |
| −5 | 11111110 |
| −4 | 1111100 |
| −3 | 11000 |
| −2...1 | 01 + (value + 2) encoded as 2 bits |
| 2 | 11001 |
| 3 | 110111 |
| 4 | 1111101 |
| 5 | 11111111 |
| 6...69 | 10 + (value − 6) encoded as 6 bits |
| 70...101 | 11010 + (value − 70) encoded as 5 bits |
| 102...133 | 111000 + (value − 102) encoded as 5 bits |
| 134...197 | 111001 + (value − 134) encoded as 6 bits |
| 198...325 | 111010 + (value − 198) encoded as 7 bits |
| 326...581 | 111011 + (value − 326) encoded as 8 bits |
| 582...1093 | 111100 + (value − 582) encoded as 9 bits |
| 1094...2117 | 111101 + (value − 1094) encoded as 10 bits |
| 2118...4165 | 1111110 + (value − 2118) encoded as 11 bits |
| 4166...∞ | 1101101111 + (value − 4166) encoded as in Table 1 |
| END | 00 |

TABLE 10

Delta Y encoding table 0

| Value | Encoding |
|---|---|
| 1 | 0 |
| 2...3 | 10 + (value − 2) encoded as 1 bit |
| 4 | 1100 |
| 5...6 | 1101 + (value − 5) encoded as 1 bit |
| 7...8 | 11100 + (value − 7) encoded as 1 bit |
| 9...12 | 11101 + (value − 9) encoded as 2 bits |
| 13...16 | 111100 + (value − 13) encoded as 2 bits |
| 17...20 | 1111010 + (value − 17) encoded as 2 bits |
| 21...28 | 1111011 + (value − 21) encoded as 3 bits |
| 29...44 | 1111100 + (value − 29) encoded as 4 bits |
| 45...76 | 1111101 + (value − 45) encoded as 5 bits |
| 77...140 | 1111110 + (value − 77) encoded as 6 bits |
| 141...∞ | 1111111 + (value − 141) encoded as in Table 1 |

TABLE 11

Delta Y encoding table 1

| Value | Encoding |
|---|---|
| 1 | 0 |
| 2 | 10 |
| 3...4 | 110 + (value − 3) encoded as 1 bit |
| 5 | 11100 |
| 6...7 | 11101 + (value − 6) encoded as 1 bit |
| 8...9 | 111100 + (value − 8) encoded as 1 bit |
| 10 | 1111010 |
| 11...12 | 1111011 + (value − 11) encoded as 1 bit |
| 13...16 | 1111100 + (value − 13) encoded as 2 bits |
| 17...24 | 1111101 + (value − 17) encoded as 3 bits |
| 25...40 | 1111110 + (value − 25) encoded as 4 bits |
| 41...72 | 11111110 + (value − 41) encoded as 5 bits |
| 73...∞ | 11111111 + (value − 73) encoded as in Table 1 |

TABLE 12

Delta Y encoding table 2

| Value | Encoding |
|---|---|
| 1 | 0 |
| 2 | 100 |
| 3 | 1100 |
| 4 | 11100 |
| 5...6 | 1101 + (value − 5) encoded as 1 bit |
| 7...13 | 101 + (value − 7) encoded as 3 bits |
| 14...15 | 111010 + (value − 14) encoded as 1 bit |
| 16...19 | 111011 + (value − 16) encoded as 2 bits |
| 20...27 | 111100 + (value − 20) encoded as 3 bits |
| 28...43 | 111101 + (value − 28) encoded as 4 bits |
| 44...75 | 111110 + (value − 44) encoded as 5 bits |
| 76...139 | 111111 + (value − 76) encoded as 6 bits |
| 140...∞ | 101111 + (value − 140) encoded as in Table 1 |

The claimed invention is:

1. A method for representing a document with a processor, comprising the steps of:

providing a first set of digital information comprising a first structured representation of the document, the first structured representation being a resolution-independent representation, a plurality of image collections being obtainable from the first structured representation, each such obtainable image collection comprising at least one image, each image in each such collection being an image of at least a portion of the document, each image in each such collection having a characteristic resolution;

generating from the first structured representation of the document a bitmap representation of the document, the bitmap representation comprising an image collection including at least one image, each image in the collection comprised by the bitmap representation being an image of at least a page of the document; and producing from the bitmap representation of the document a second set of digital information comprising a second structured representation of the document, the second structured representation being a lossless representation of a particular image collection, the particular image collection being one of the plurality of image collections obtainable from the first structured representation, the second structured representation including a plurality of tokens and a plurality of positions, the second set of digital information being produced by extracting the plurality of tokens from the bitmap representation of the document, each token comprising a set of pixel data representing a subimage of the particular image collection, and determining the plurality of positions from the bitmap representation of the document, each position being a position of a token subimage in the particular image collection, a token subimage being one of the subimages from one of the tokens, at least one token subimage having a plurality of pixels and occurring at more than one position in the particular image collection.

2. The method of claim 1 wherein the providing step comprises providing the processor with a first structured representation selected from the group consisting of a page description language representation, a document exchange format representation, a print control language representation, and a markup language representation.

3. The method of claim 1 wherein the providing step comprises providing the processor with a first structured representation that is an original representation of the document, the original representation being a representation generated by a computer program wherein the document is created.

4. The method of claim 1 wherein the providing step comprises providing the processor with a font-based first structured representation of the document, and wherein the producing step comprises producing a fontless second structured representation of the document.

5. The method of claim 1 wherein the producing step comprises producing a resolution-dependent second structured representation adapted to the characteristic resolution of at least one image of the particular image collection.

6. The method of claim 1 further comprising the step of providing the second set of digital information to an information storage device.

7. The method of claim 1 further comprising the step of transmitting the second set of digital information via a network.

8. The method of claim 1 further comprising the step of producing from the second set of digital information a human-readable representation of at least a portion of the document.

9. The method of claim 1 further comprising the step of providing a processor with the second set of digital information, the processor to which the second set of digital information is thus provided being referred to as the "decoding" processor, and further comprising the steps of:

with the decoding processor, producing from the second set of digital information a third set of digital information comprising an image collection including at least one image, each image in the image collection comprised by the third set of digital information being an image of at least a portion of the document, the third set of digital information being produced by constructing from the token subimages each image in said image collection comprised by the third set of digital information, each constructed image including a token subimage in at least one of the positions; and making the third set of digital information thus produced available for further use.

10. The method of claim 9 wherein the step of producing the third set of digital information comprises constructing from the token subimages an image selected from the group consisting of an uncompressed image, a binary image, a pixel image, a raster image, a bitmap image, a compressed image, a CCITT Group 4 compressed image, and a JBIG compressed image.

11. The method of claim 9 wherein the step of making the third set of digital information available for use comprises providing to a document output device at least a subset of the third set of digital information, the subset including at least a portion of at least one image of the image collection comprised by the third set of digital information, and further comprising the step of:

rendering the subset thus provided with the document output device, thereby producing a human-readable representation of at least a portion of the document.

12. A method comprising the step of transmitting the second set of digital information produced and made available as recited in claim 1.

13. A method comprising the steps of:

providing a processor with the second set of digital information produced and made available as recited in claim 1, the processor to which the second set of digital information is thus provided being referred to as the "decoding" processor;

with the decoding processor, producing from the second set of digital information a third set of digital information comprising an image collection including at least one image, each image in the image collection comprised by the third set of digital information being an image of at least a portion of the document, each image in the image collection comprised by the third set of digital information being constructed of the token subimages and including a token subimage in at least one of the position; and making the third set of digital information thus produced available for further use.

14. The method of claim 13 further comprising the step of:

providing the decoding processor with a program comprising instructions executable by the decoding processor, the instructions of the program serving to instruct the decoding processor to produce from the second set of digital information a third set of digital information, the third set of digital information comprising an image collection including at least one image, each image in the image collection comprised by the third set of digital information being an image of at least a portion of the document, each image in the image collection comprised by the third set of digital information being constructed of the token subimages and including a token subimage in at least one of the positions.

15. An article of manufacture comprising an information storage medium wherein is stored information including the second set of digital information produced and made available as recited in claim 1.

16. The article of manufacture of claim 15 wherein the information stored in the information storage medium further includes a computer program for facilitating production by a processor from the second set of digital information thus stored in the computer-readable information storage medium a third set of digital information, the third set of digital information comprising an image collection including at least one image, each image in the image collection comprised by the third set of digital information being an image of at least a portion of the document, each image in the image collection comprised by the third set of digital information being constructed of the token subimages and including a token subimage in at least one of the positions.

17. The article of manufacture of claim 15 wherein the second structured representation of the document is a resolution-independent representation expressed in a reduced subset of a page description language.

18. The article of manufacture of claim 15 wherein each token of the second structured representation of the document includes an explicit token identifier.

19. The article of manufacture of claim 15 wherein the tokens of the second structured representation of the document are in a sequence, and each token has an identifier represented implicitly by the position of the token within the sequence.

20. The article of manufacture of claim 15 wherein the second structured representation of the document further includes a plurality of annotations, each annotation comprising a hypertext link.

21. The article of manufacture of claim 15 wherein the second structured representation of the document further includes a plurality of annotations, each annotation comprising a reference to a computational object.

22. An article of manufacture comprising an information storage medium wherein is stored information comprising a computer program including method steps for facilitating production by a processor of a second set of digital information from a first set of digital information, said method steps comprising:

providing a first set of digital information comprising a first structured representation of a document, the first structured representation being a resolution-independent representation, a plurality of image collections being obtainable from the first structured representation, each such obtainable image collection comprising at least one image, each image in each such collection being an image of at least a portion of the document, each image in each such collection having a characteristic resolution;

generating from the first structured representation of the document a bitmap representation of the document, the bitmap representation comprising an image collection including at least one image, each image in the collection comprised by the bitmap representation being an image of at least a page of the document; and producing from the bitmap representation of the document a second set of digital information comprising a second structured representation of the document, the second structured representation being a lossless representation of a particular image collection, the particular image collection being one of the plurality of image collections obtainable from the first structured representation, the second structured representation including a plurality of tokens and a plurality of positions, the second set of digital information being produced by extracting the plurality of tokens from the bitmap representation of the document, each token comprising a set of pixel data representing a subimage of the particular image collection, and determining the plurality of positions from the bitmap representation of the document, each position being a position of a token subimage in the particular image collection, a token subimage being one of the subimages from one of the tokens, at least one token subimage having a plurality of pixels and occurring at more than one position in the particular image collection.

23. Apparatus comprising:

a processor;

an instruction store, coupled to the processor, comprising an article of manufacture as recited in claim 22; and a data store, coupled to the processor, wherein the first and second sets of digital information can be stored.

24. The apparatus of claim 23 wherein the data store comprises at least one component selected from the group consisting of a memory, a persistent storage device, a server computer, a computer network, and a portion of a computer network.

25. The apparatus of claim 23 and further comprising an output device, coupled to the processor, for outputting the second set of digital information.

26. The article of manufacture as recited in claim 22, wherein said method steps further comprise the step of producing a third set of digital information comprising an image collection including at least one bitmap image, each bitmap image in the image collection comprised by the third set of digital information being a bitmap image of at least a portion of the document, each bitmap image in the image collection comprised by the third set of digital information being constructed of the token subimages and including a token subimage in at least one of the positions.

27. Apparatus comprising:

a processor;

an instruction store, coupled to the processor, comprising an article of manufacture as recited in claim 26;

an input device, coupled to the processor, from which input device the processor can be provided with the second set of digital information; and an output device, coupled to the processor, to which output device the processor can provide the third set of digital information.

28. The apparatus of claim 27 wherein:

the input device includes at least one component selected from the group consisting a memory, a persistent storage device, a server computer, a computer network, a portion of a computer network, a telephone for receiving a facsimile transmission, a data receiving device, and a network interface device; and the output device includes at least one component selected from the group consisting of a printer, a visual display, an IOT, a memory, a persistent storage device, a server computer, a computer network, a portion of a computer network, a telephone for making a facsimile transmission, a data transmission device, and a network interface device.

29. A method for representing a document with a processor, comprising the steps of:

providing a first structured representation of a set of document pages; the first structured representation being a resolution-independent representation of the set of document pages;

generating, from the first structured representation of document pages, a set of bitmap images; each bitmap image in the set of bitmap images having a characteristic resolution and representing a different page in the set of document pages; and producing a second structured representation of the document using the set of bitmap images; the second structured representation providing a lossless representation of each bitmap image produced by said producing step; the second structured representation including a plurality of tokens and a plurality of positions formed by:

extracting the plurality of tokens from the set of bitmap images; each token being defined by a set of pixel data representing a subimage of a particular bitmap image, and determining the plurality of positions of each token extracted from the set of bitmap images; the plurality of positions having ones of the plurality of tokens occurring at more than one position in the set of bitmap images.

* * * * *